United States Patent
Rodriguez Barros

(10) Patent No.: US 8,491,170 B2
(45) Date of Patent: Jul. 23, 2013

(54) MULTI-PURPOSE EXTERNAL REAR-VIEW MIRROR UNIT FOR VEHICLES

(76) Inventor: Alejandro Rodriguez Barros, Barcelona (ES)

(*) Notice: Subject to any disclaimer, the term of this patent is extended or adjusted under 35 U.S.C. 154(b) by 131 days.

(21) Appl. No.: 13/129,160

(22) PCT Filed: Nov. 13, 2009

(86) PCT No.: PCT/ES2009/000538
§ 371 (c)(1),
(2), (4) Date: Aug. 8, 2011

(87) PCT Pub. No.: WO2010/055178
PCT Pub. Date: May 20, 2010

(65) Prior Publication Data
US 2012/0039082 A1 Feb. 16, 2012

(30) Foreign Application Priority Data
Nov. 13, 2008 (ES) .................................. 200803291

(51) Int. Cl.
*B60Q 1/26* (2006.01)
*B60R 1/12* (2006.01)

(52) U.S. Cl.
USPC ............................. 362/494; 362/545; 362/800

(58) Field of Classification Search
USPC ................. 362/494, 545, 800, 540, 543, 555, 362/135, 140, 240, 511, 548, 549, 300, 307, 362/311.01, 311.02
See application file for complete search history.

(56) References Cited

U.S. PATENT DOCUMENTS

| | | | |
|---|---|---|---|
| 6,926,432 B2 | 8/2005 | Rodriguez Barros | |
| 7,188,981 B2 | 3/2007 | Rodriguez Barros | |
| 7,192,171 B2 | 3/2007 | Rodriguez Barros | |
| 7,255,464 B2 | 8/2007 | Rodriguez Barros | |
| 7,258,471 B2 | 8/2007 | Rodriguez Barros | |
| 2002/0171954 A1* | 11/2002 | Bonardi et al. | 359/877 |
| 2003/0058654 A1* | 3/2003 | Pastrick et al. | 362/494 |
| 2004/0190303 A1 | 9/2004 | Mishimagi | |
| 2005/0190465 A1* | 9/2005 | Henion et al. | 359/864 |
| 2006/0012990 A1* | 1/2006 | Walser et al. | 362/235 |
| 2008/0309510 A1 | 12/2008 | Mandagaran | |
| 2011/0001428 A1* | 1/2011 | Rodriguez Barros et al. | 315/77 |

FOREIGN PATENT DOCUMENTS

| | | |
|---|---|---|
| EP | 0967118 A2 | 12/1999 |
| WO | 0208015 A1 | 1/2002 |
| WO | 2005073026 A1 | 8/2005 |
| WO | 2005081849 A2 | 9/2005 |
| WO | 2009090285 A1 | 7/2009 |

* cited by examiner

*Primary Examiner* — Anh Mai
*Assistant Examiner* — Kevin Quarterman
(74) *Attorney, Agent, or Firm* — Hess Patent Law Firm LLC; Robert J. Hess

(57) ABSTRACT

A kitchen container make of flexible material (such as a silicone elastomer) for culinary applications. The flexible material is capable of being deformed into different positions befitting different uses, in particular cooking in a microwave and in a conventional oven. Opposite openings separated by portions of two sides of a perimetric wall of the kitchen container facilitate air circulation and partial retention of vapours while cooking.

13 Claims, 22 Drawing Sheets

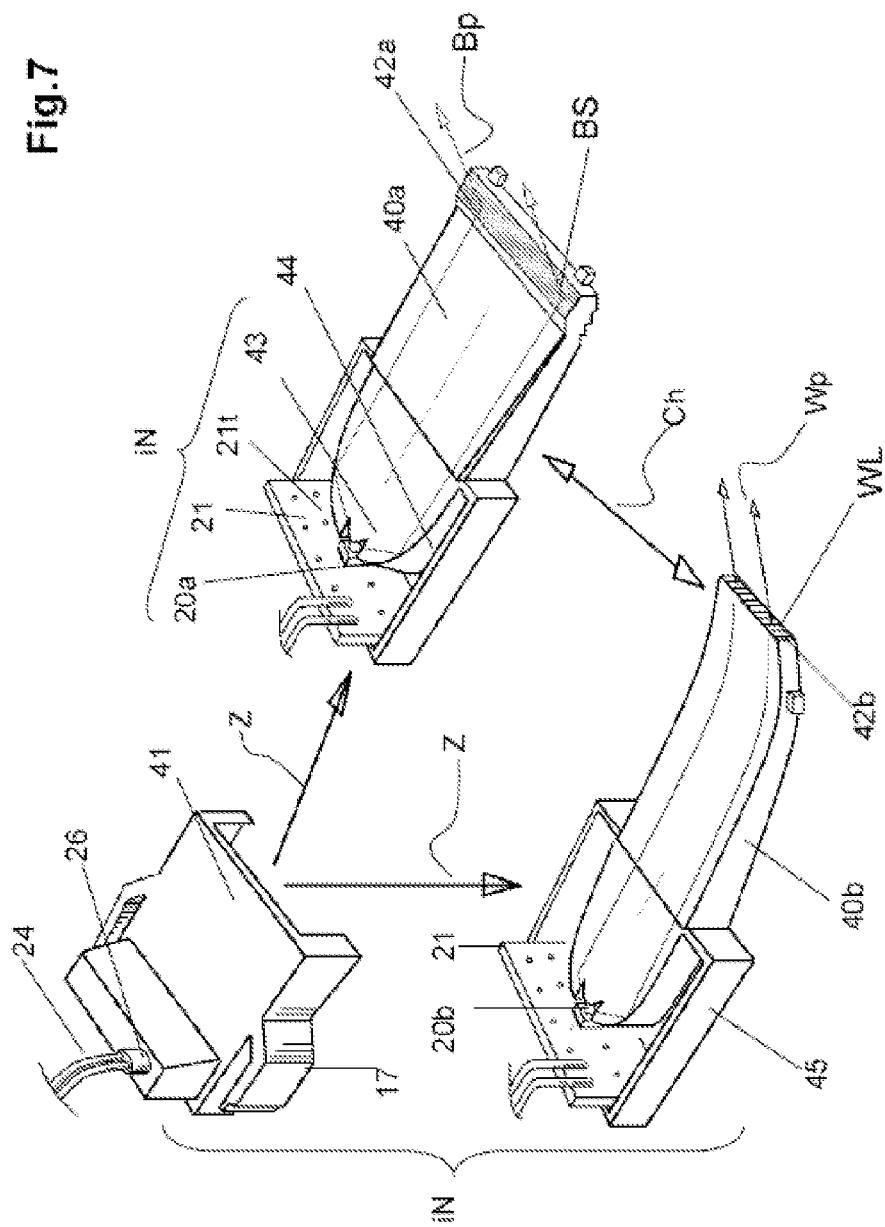

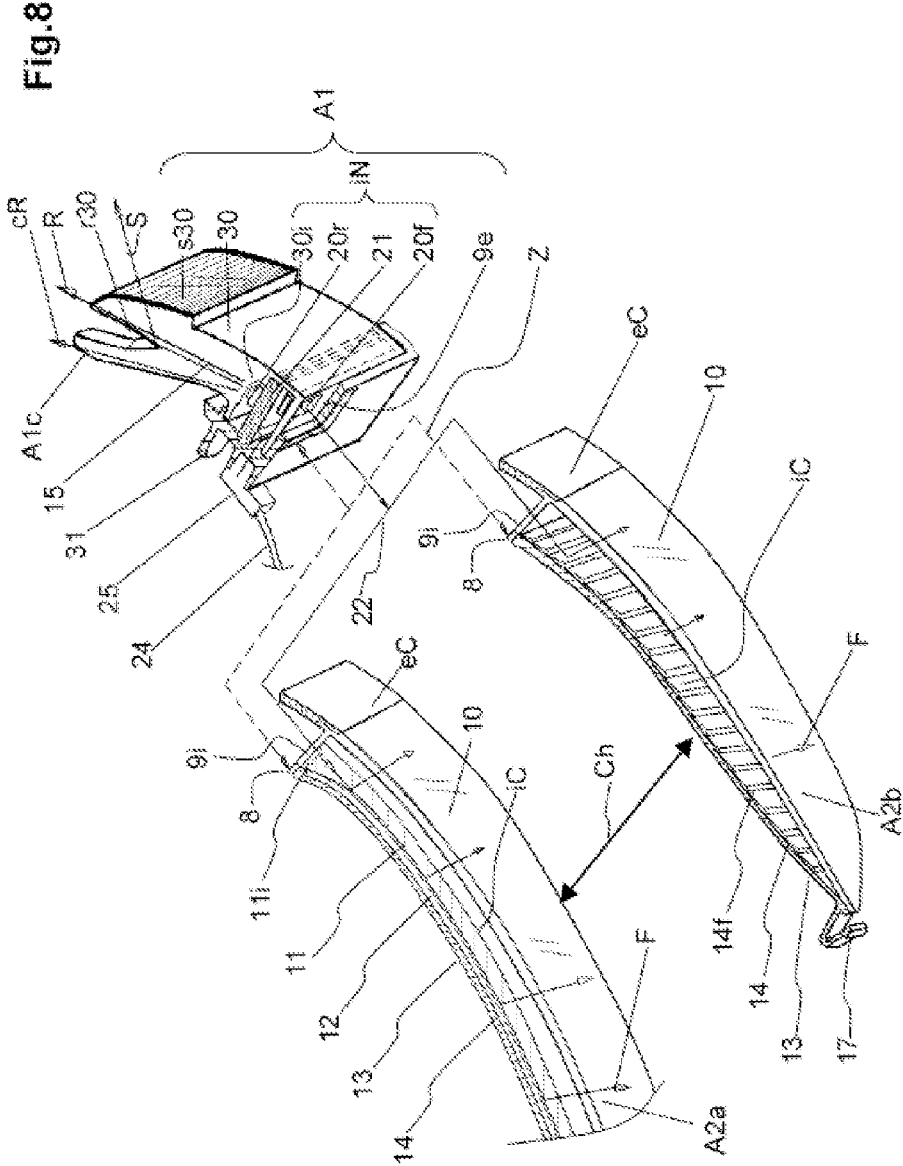

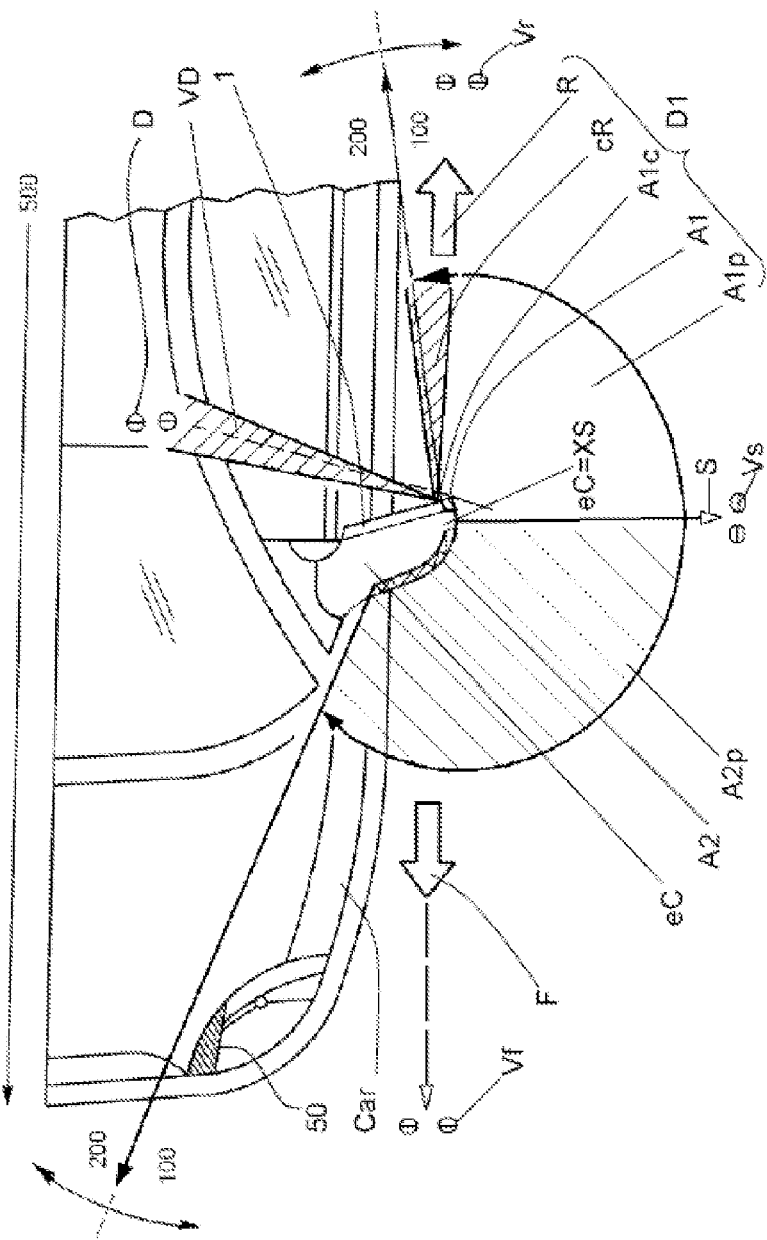

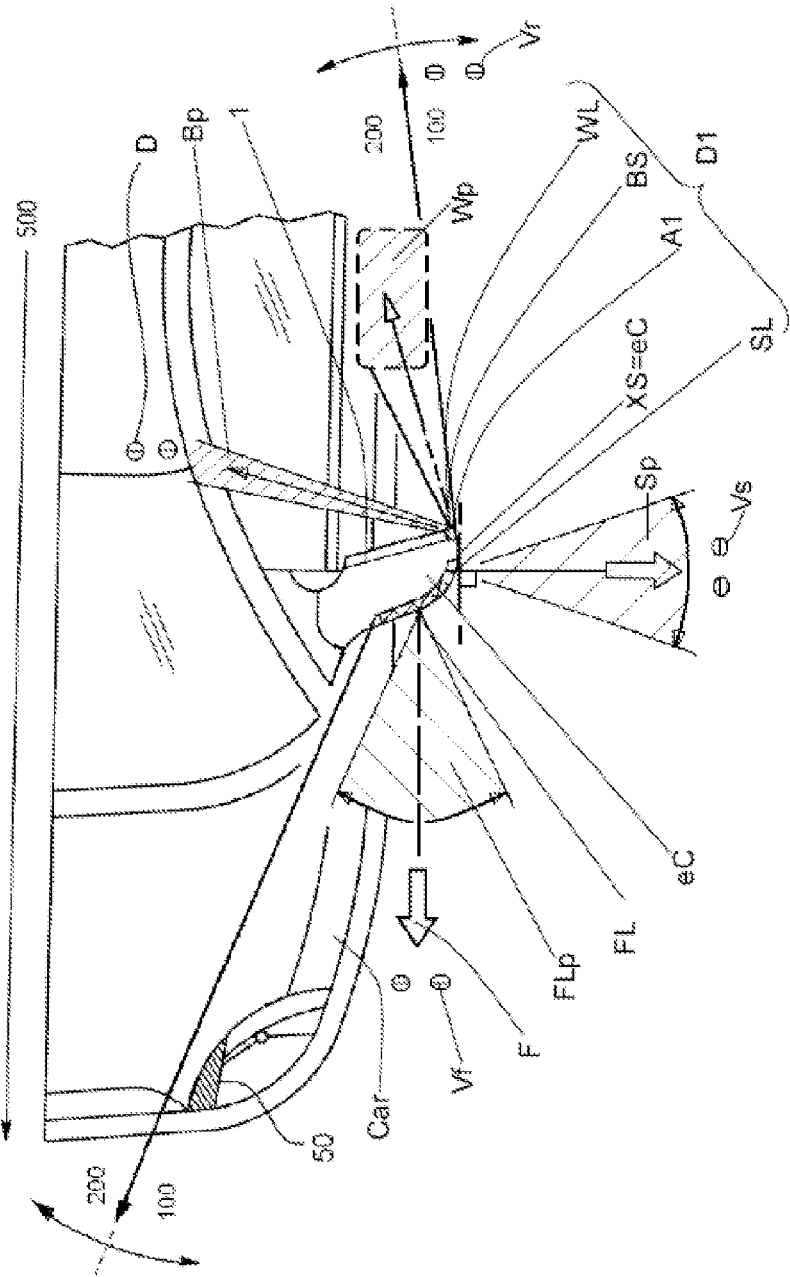

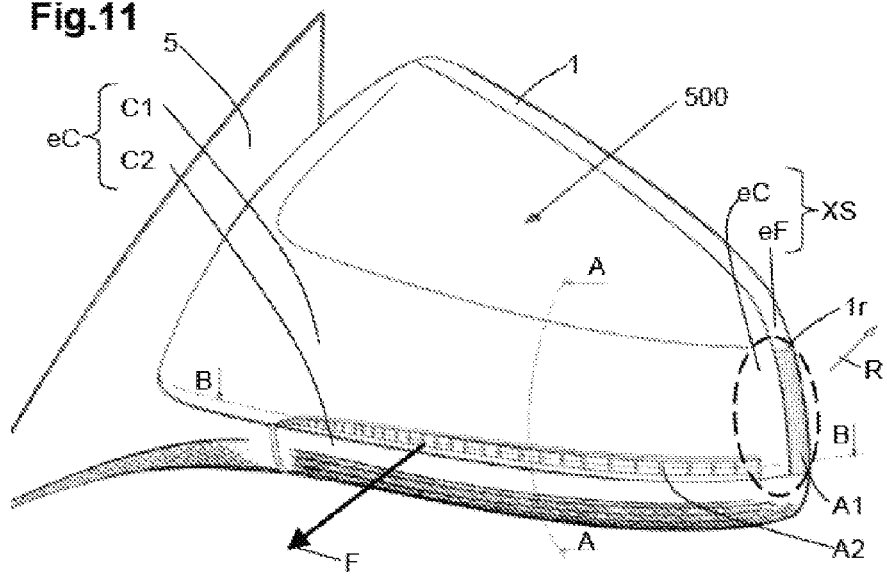
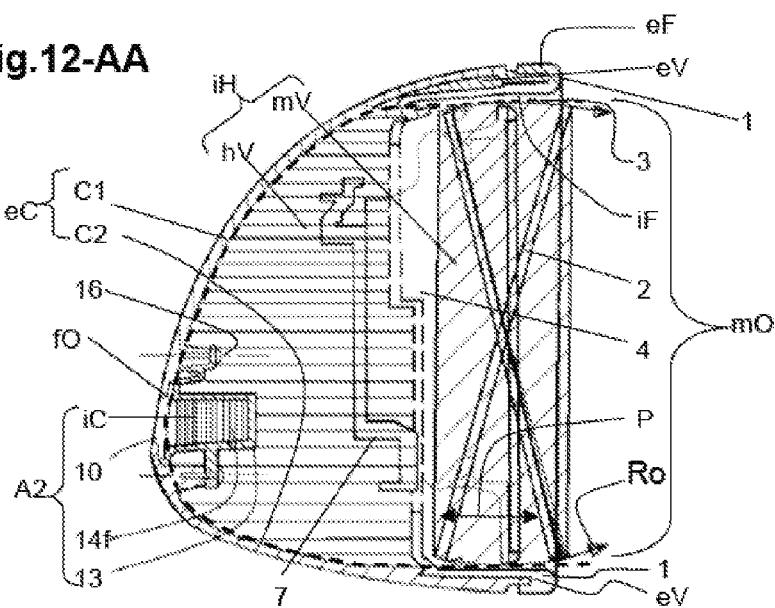

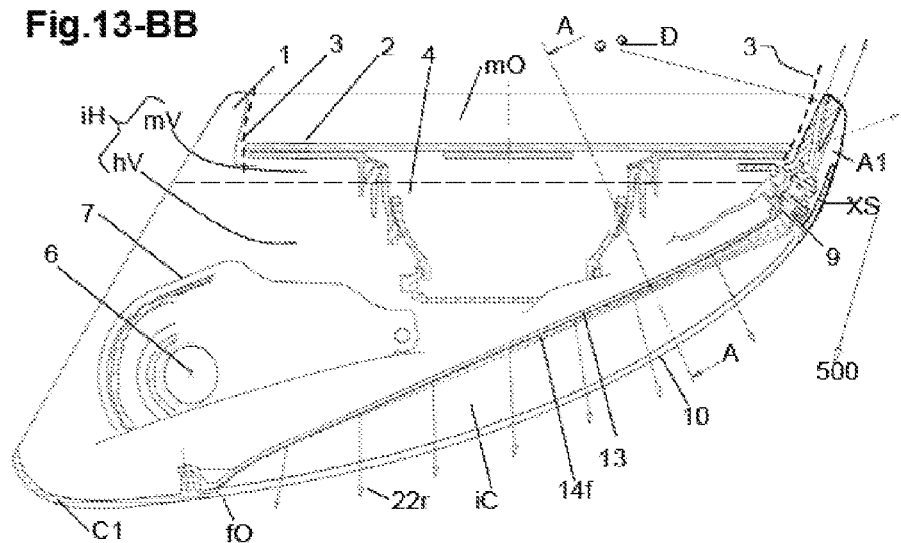
Fig.13-BB
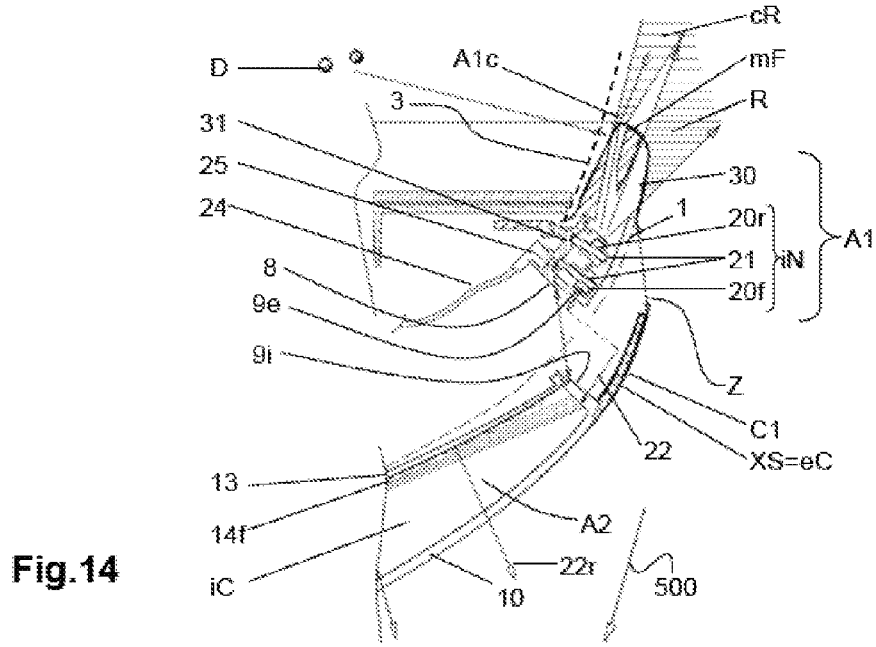
Fig.14

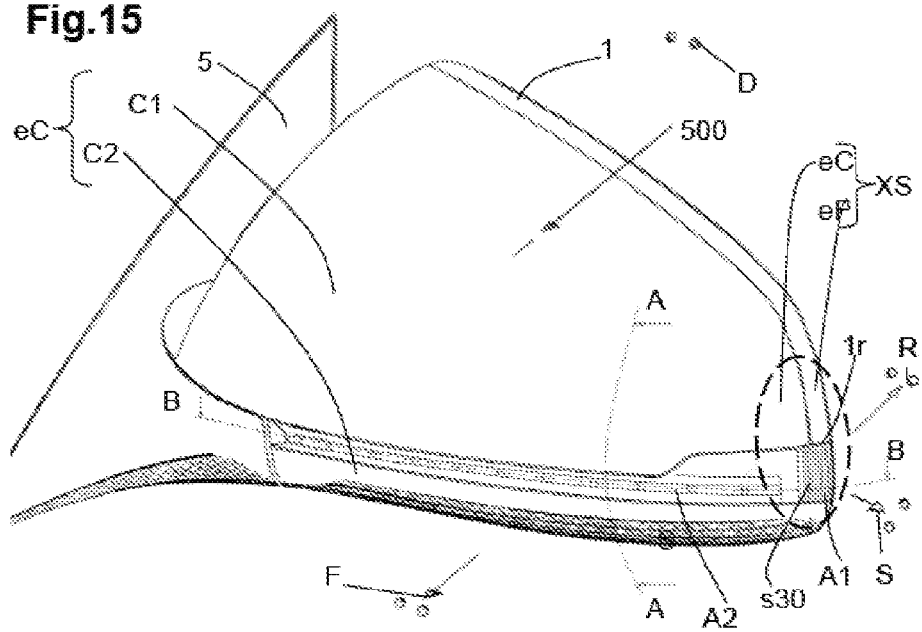
Fig.15
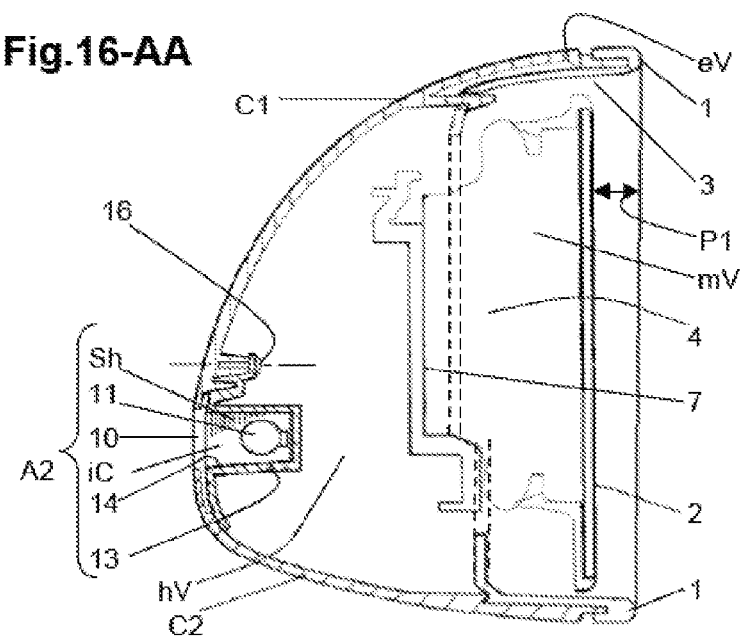
Fig.16-AA

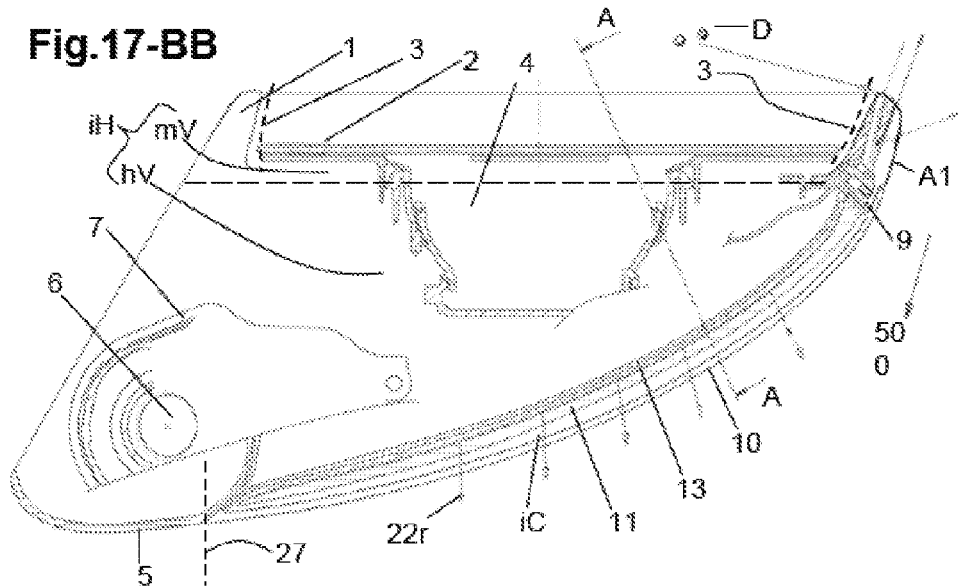
Fig. 17-BB
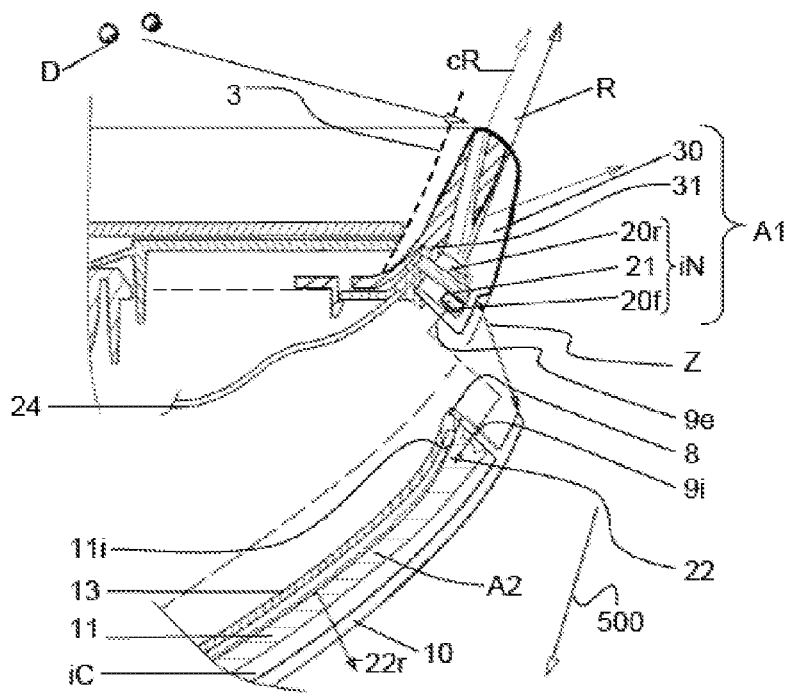
Fig. 18

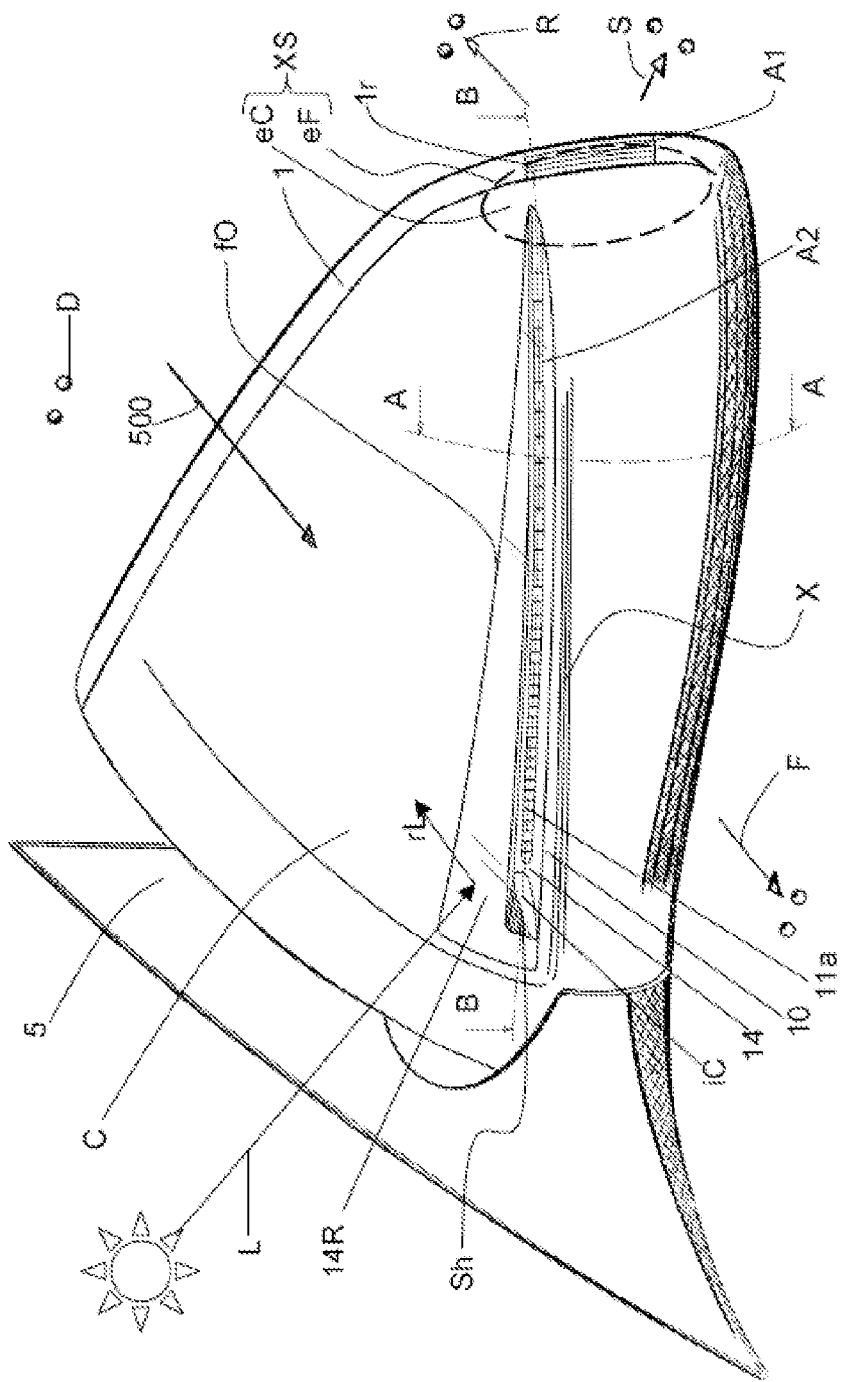

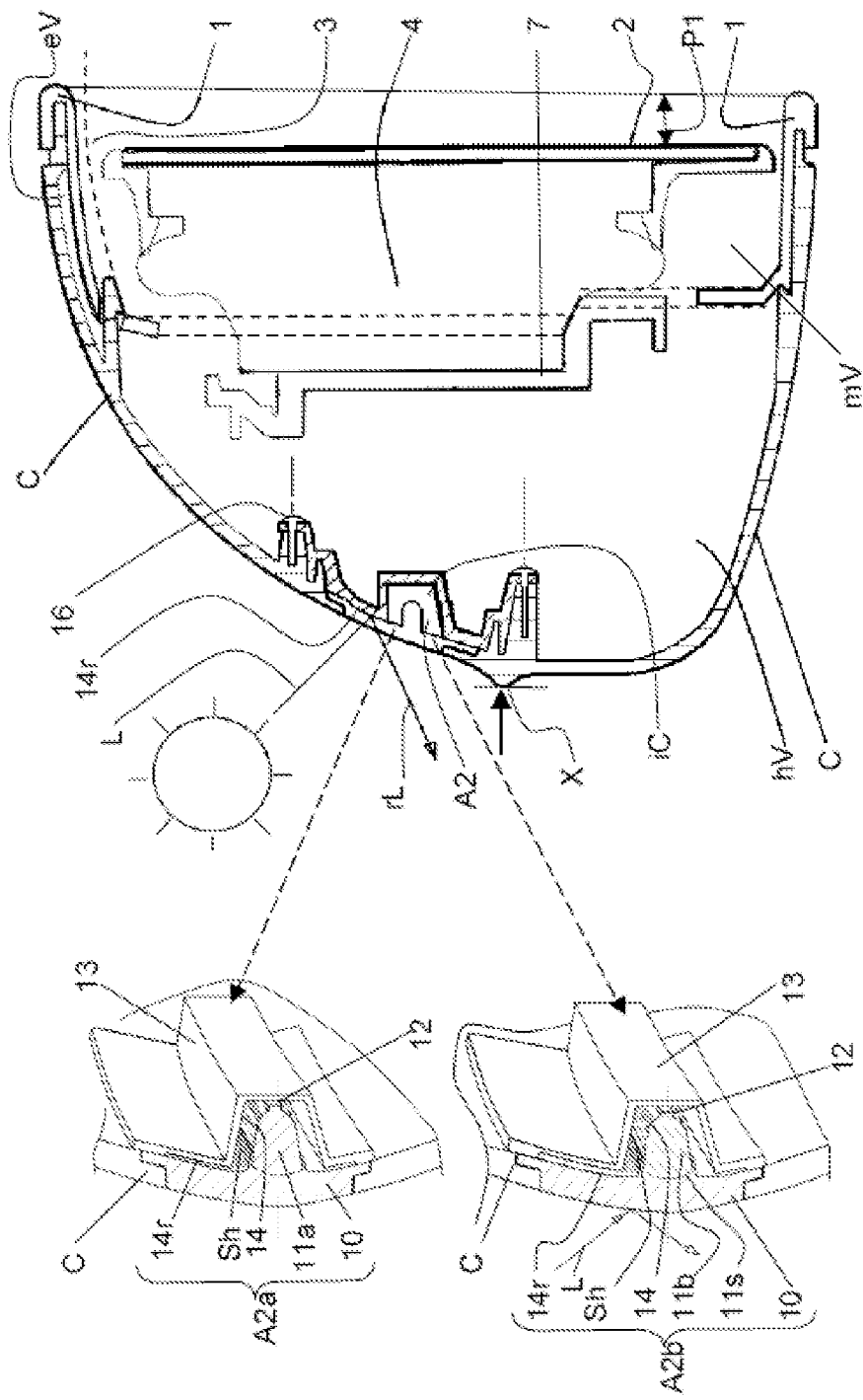

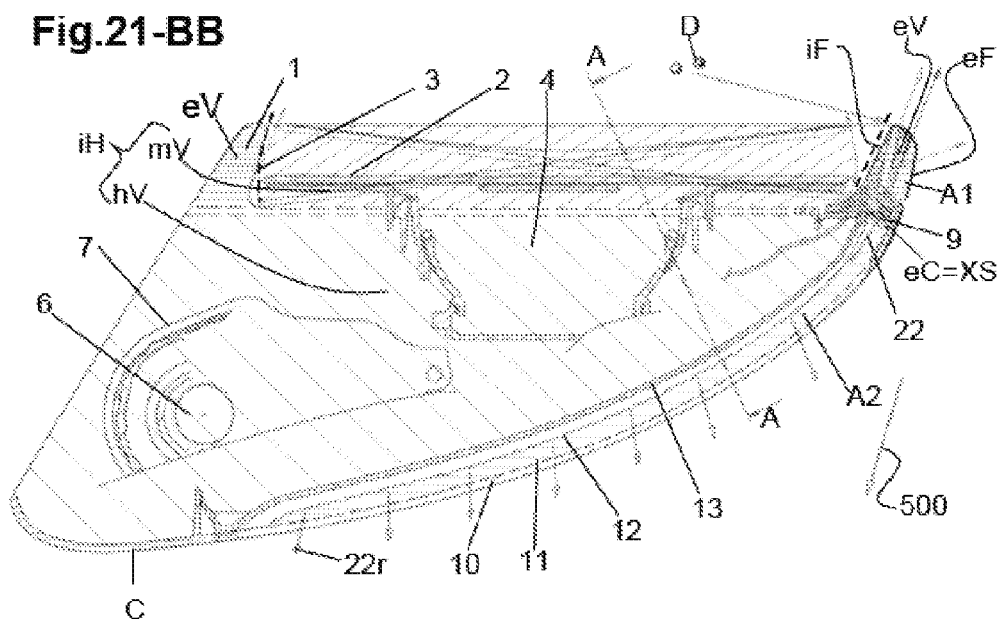
Fig.21-BB
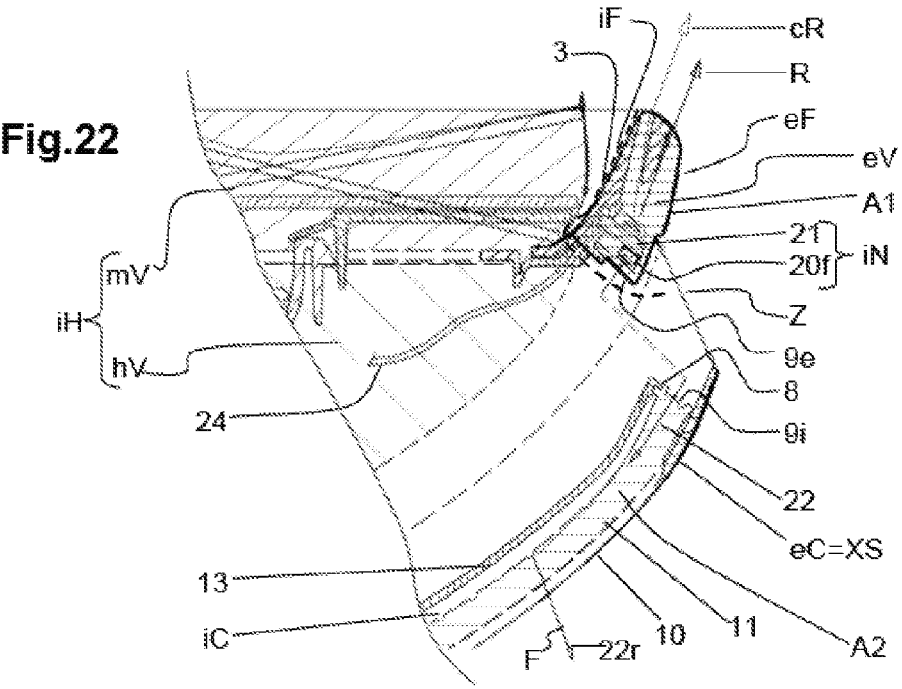
Fig.22

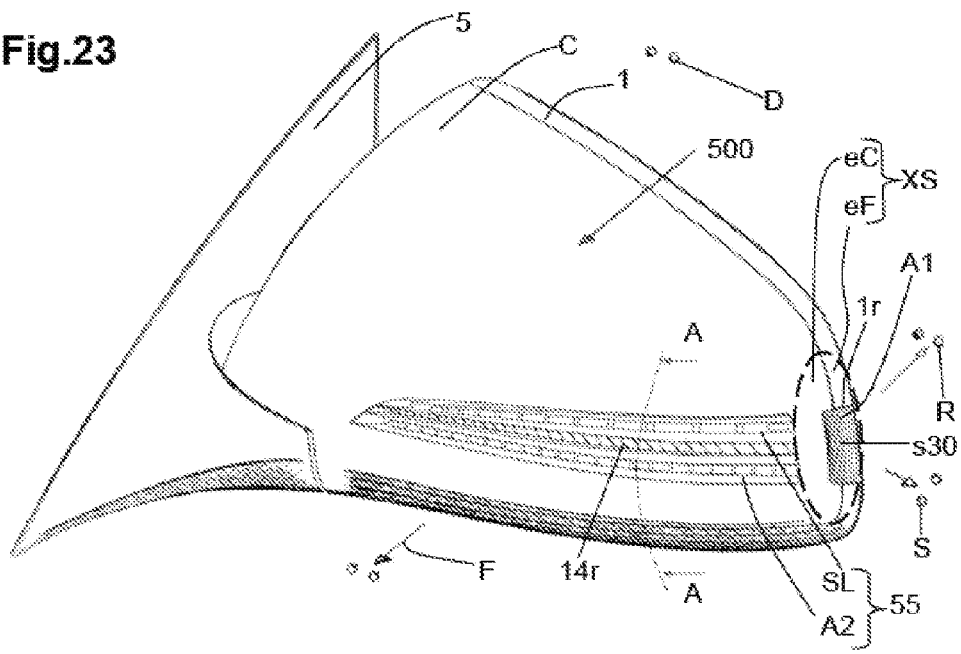
Fig.23
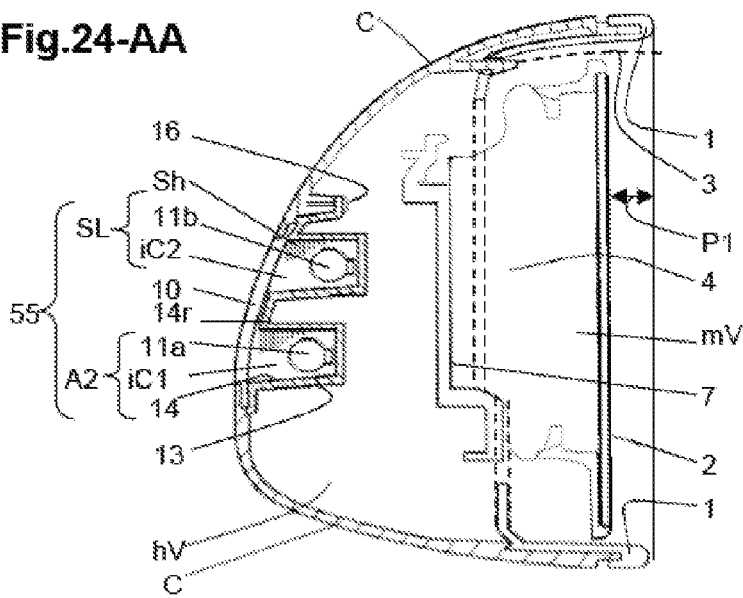
Fig.24-AA

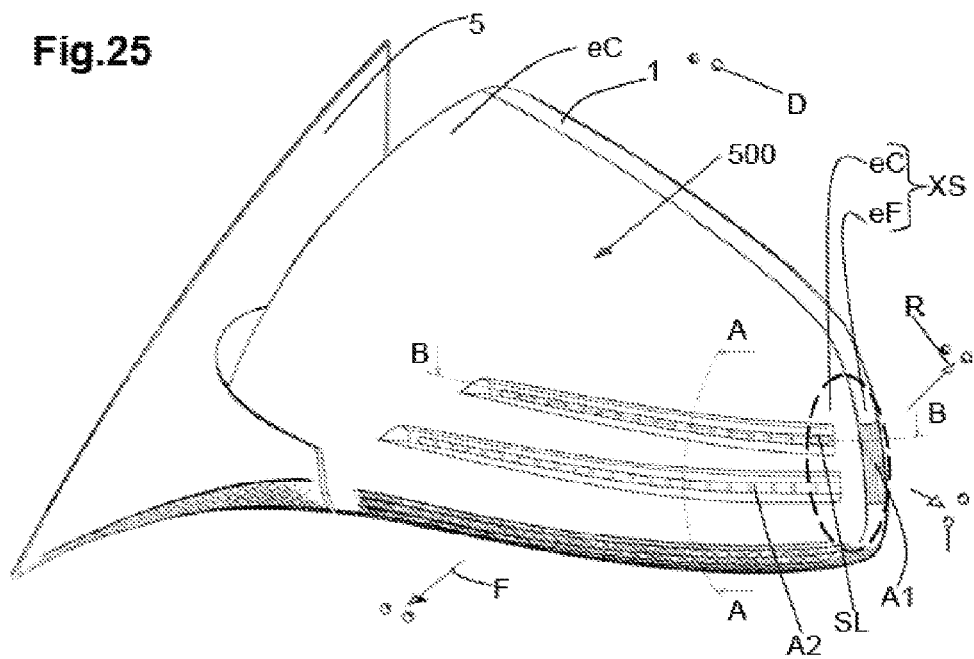
Fig.25
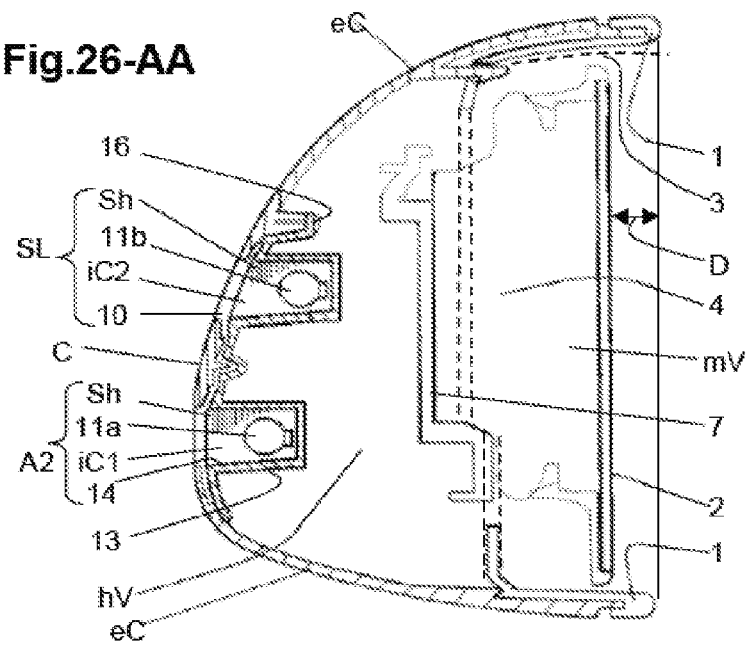
Fig.26-AA

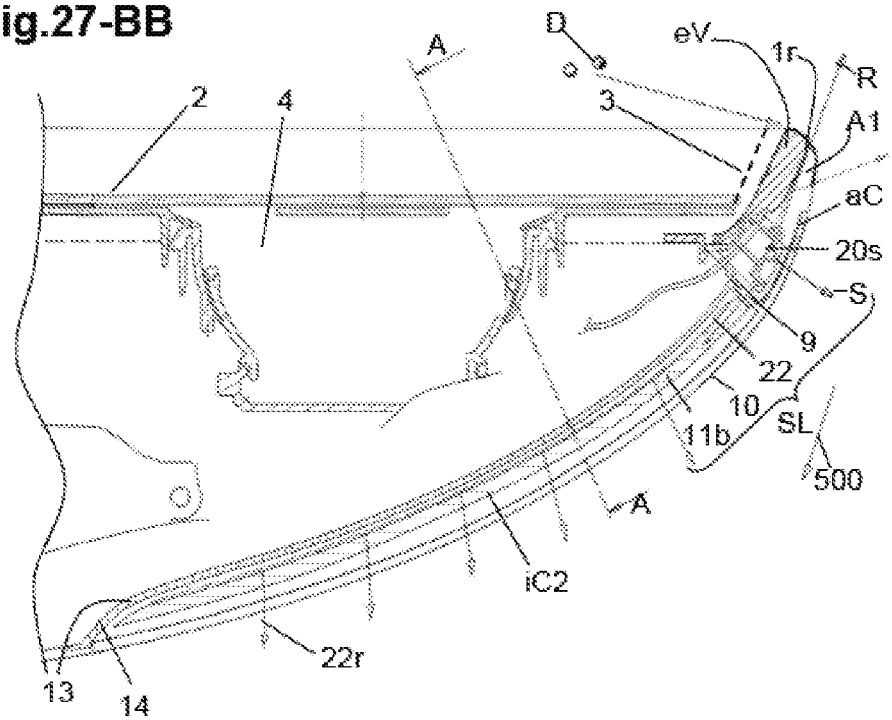
Fig.27-BB
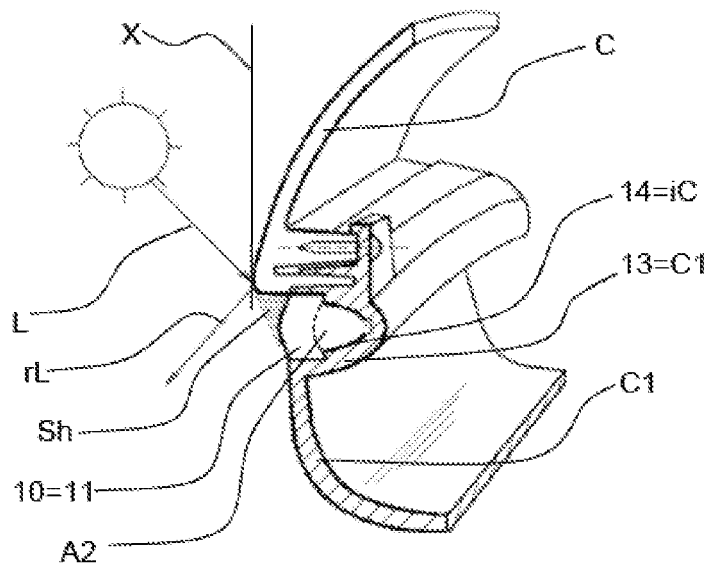
Fig.28

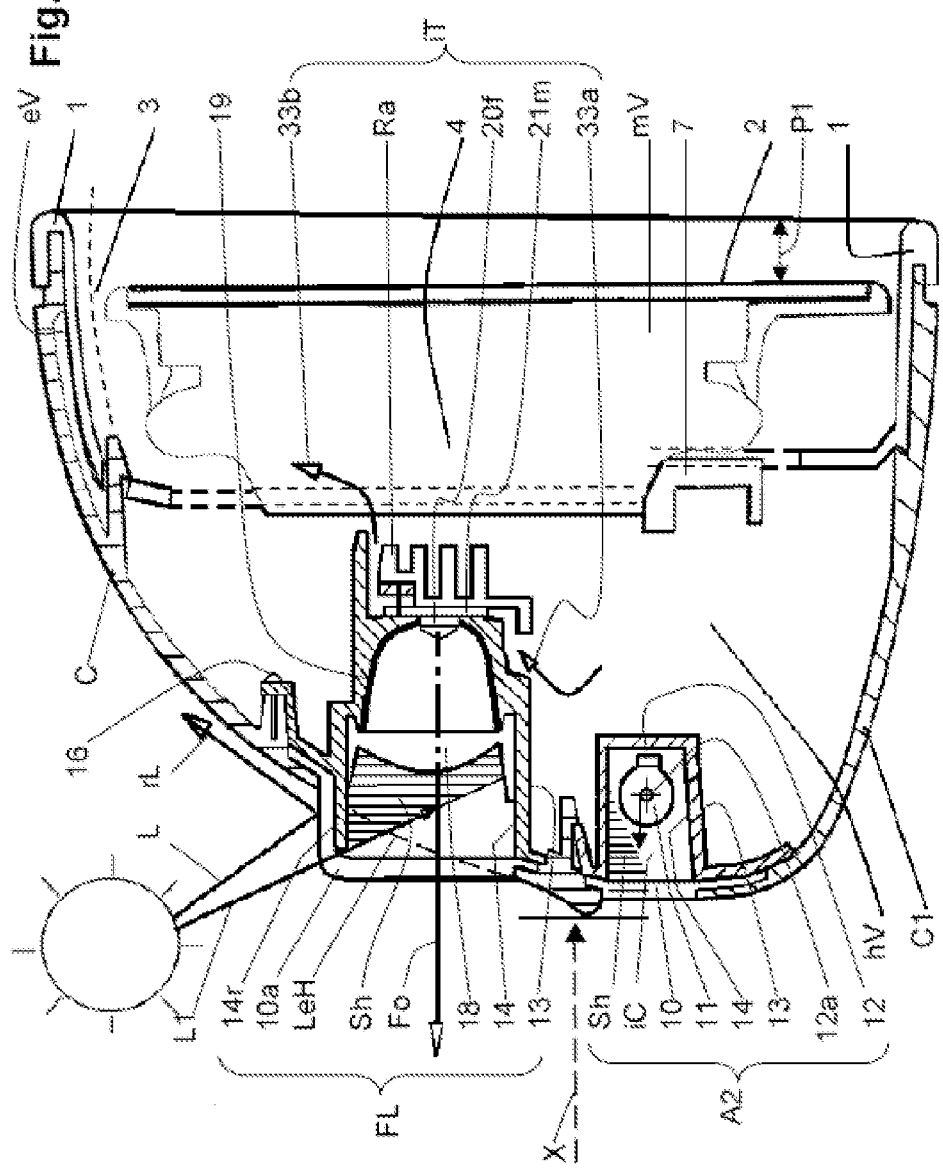

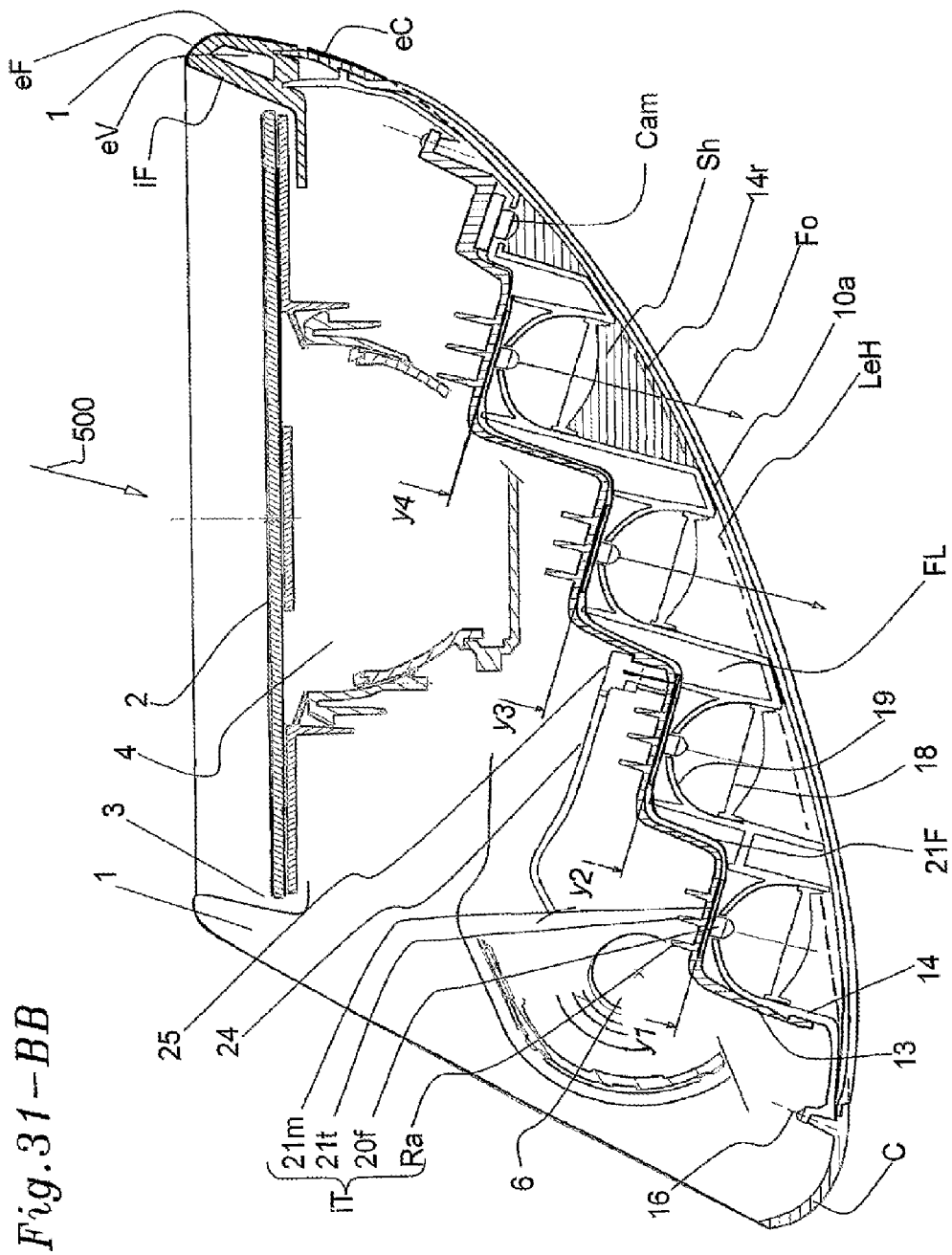
Fig.31-BB

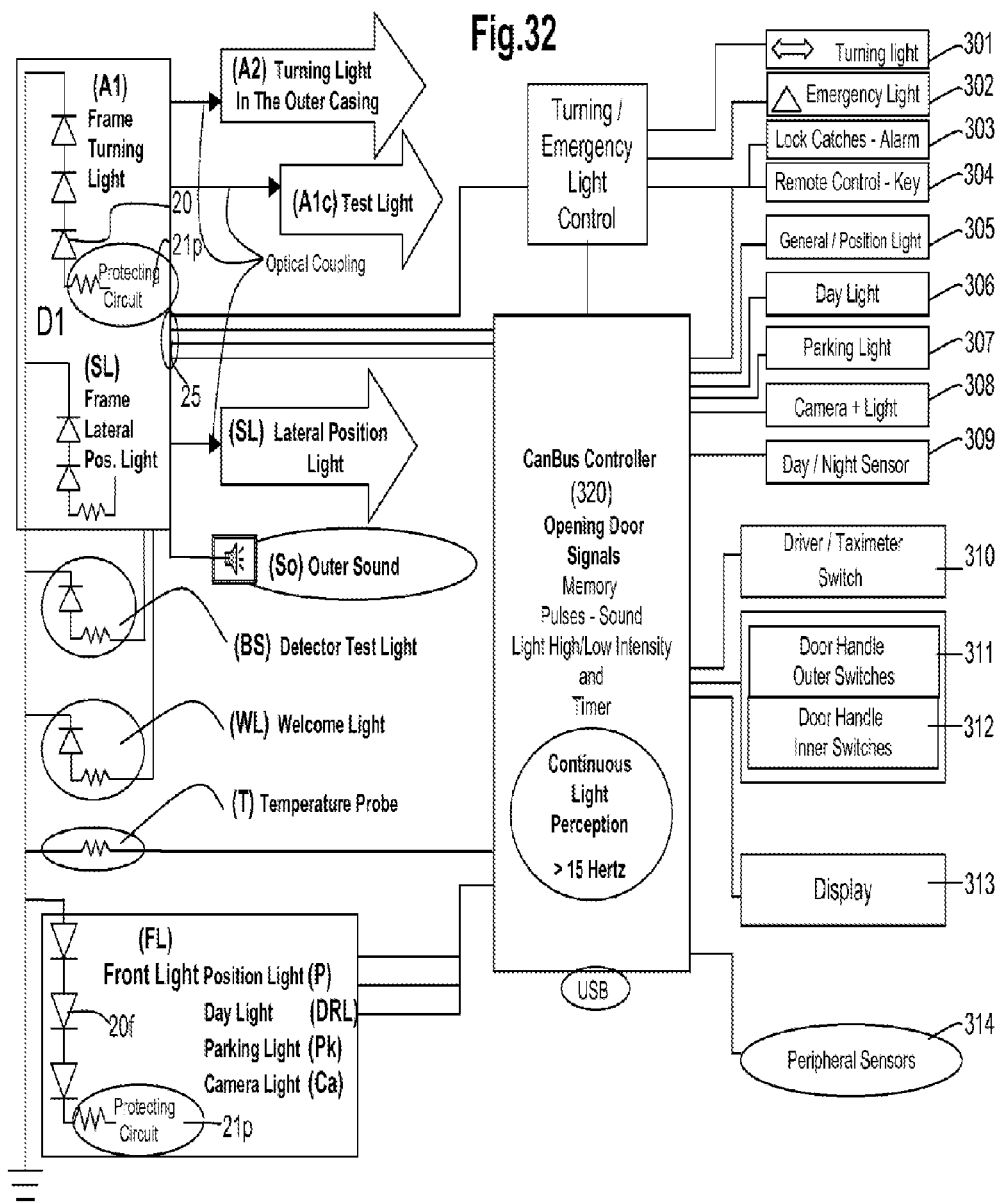

MULTI-PURPOSE EXTERNAL REAR-VIEW MIRROR UNIT FOR VEHICLES

FIELD OF THE ART

The present invention relates in general to a multifunction wing rear-view mirror for vehicles adapted to emit at least one turning signal in three directions—forwards, to the side and rearwards—and, in particular, to a rear-view mirror arrangement made up by an outside cover, a wing frame surrounding a mirror, and having, in a portion of said frame, a first luminous blinking device with its own light source, fit to emit at least one turning signal rearwards and to the side, and a second lacking its own light source and independent in construction from the first one, located in an area of said outside cover, having reflective means to emit a turning signal directed to the front of the vehicle, after receiving a conjoint beam of light from the light source of said first luminous blinking device by means of an optical coupling.

STATE OF THE BACKGROUND ART

A number of patents are known related to rear-view mirror arrangements with a turning signal being emitted in three directions—forwards, to the side and rearwards. In order to produce these directions of emission of the signal, these rear-view mirrors have one single luminous module or device emitting through a window closed by an outside transparent cover extending from the frontal part, opposite the main mirror, to the farthest point from the bodywork, wherein they exhibit a protrusion, an irregularity or a shape that permits the emission of light rearwards and to the side. By U.S. Pat. No. 5,371,659, blinking devices are known that are placed in the lower part and under the line of the rear-view mirror, a position that increases the casing volume, air resistance and petrol consumption, and the part emitting light rearwards is visible by the driver's eyes. Therefore, we shall focus on devices emitting a signal rearwards through the farthest point from the bodywork that occupy an inner volume behind the mirror in said rear-view mirror arrangement.

Said blinking devices are curved and elongated, which entails problems such as:

Moulds of curved, elongated pieces have a complicated, costly demoulding.

They are unstable, become deformed and it is difficult to make them match in the overall assembly.

Welding curved pieces together is complicated, slow and costly.

The protrusion of the transparent cover matches the lateral protruding area of the vehicle liable to receive collisions.

Each rear-view mirror has a different external curve and shape, which prevents the standardisation of pieces so that they will be used in various vehicles and implies longer time for their development, higher cost of the moulds and more pieces and tools.

One solution to these problems is building the blinking device in two shorter, flatter interconnected stretches, one of them emitting rearwards while the other emits forwards and to the side. As they are interconnected, cables and limited mobility are also a problem.

U.S. Pat. No. 6,280,068 relates to a rear-view mirror arrangement that incorporates one single curved luminous device containing a partition wall that divides its interior into two chambers, one of them emitting a signal rearwards and the other emitting forwards. Both chambers make up one single device that, apart from being in the lateral area of the casing, must be shifted outwardly because of the lack of room so that the frame will not interfere its projection of light rearwards, whereby it receives collisions.

Another rear-view mirror arrangement with one single curved luminous module to emit a luminous turning signal forwards, to the side and rearwards is presented in U.S. Patent No. 2001010633A1, which, in paragraph [18], describes how its light-transmitting cover 13 is secured by means of welding, through its edge 14, to the edge of the lighting unit casing 12. The problem of welding such curved pieces together has already been mentioned above.

DISCLOSURE OF THE INVENTION

As a solution to the problems not embraced by the current state of the art, a rear-view mirror arrangement is provided whose product technique and construction method include:

At least two shorter blinking devices that replace a long one with a large curvature, independent in construction, but associated as far as functionality goes. Their individual assembly implies flatter welding seams, which makes their assembly easier, faster and more reliable.

The first of them is based on a transparent solid deep-seatedly located in the frame, which, being powered by cables, has its own light source and emits a luminous signal rearwards, cooperates and works jointly with the second one, to which it transmits a beam of light.

The second luminous device, located in the casing, lacking its own light source, has an internal duct devoid of electric components, cables, circuits or emitters, uses internal reflective means to emit the same signal, but forwardly after receiving, by means of optical coupling, part of the light generated in said first device.

The present invention relates to a multifunction wing rear-view mirror arrangement for vehicles comprising:

A wing frame having an inner surface and another outside one which define a first opening oriented rearwards relative to the vehicle's axis of circulation wherein a rear-viewing element, mirror and/or camera associated to said frame are located.

An outside cover formed by preferably opaque, painted, chromicised or decorated structural parts, which are selectable and combinable among at least one or several casing covers, in part a supplementary casing cover, a face surface of a structure or of a device adjacent to said frame, or a single-piece casing that includes said frame.

An external association area formed between a portion of said outside cover adjacent to a portion of the outer surface of said frame.

An inner volume of the rear-view mirror arrangement defined by the volume enclosed by said outside cover and the volume of the rear-viewing element in its various adjustment positions.

A wing frame volume or thickening of said frame, independent from said inner volume, defined between the frame inner surface and said external association area, said outer volume preferably being located in the third farthest away from the bodywork.

A first blinking device with its own light source, adapted to emit a luminous signal that is, at least, a turning signal directed rearwards and to the side of said vehicle and which occupies, with a transparent or translucent external surface, a portion of said wing frame or a portion of the outside cover adjacent to said frame, or a portion of both associated parts—the wing frame and the outside cover—and at least one part of said framework volume, which preferably matches the third farthest away from the bodywork.

A second opening, which is at least one, located in said outside cover, preferably behind and to the side of the rear-viewing element.

At least one second blinking device, lacking its own light source and independent in construction from the first one, occupies, with a transparent or translucent external surface, said second opening, and it has at least one internal cavity, formed by a supporting opaque body with internal reflective optical means associated to said transparent external surface, wherein it has at least one light input that is a transparent internal part matching at least one internal light output of said first blinking device, wherein an optical coupling takes place through which it receives at least one conjoint beam of light transmitted from the light source of said first blinking device, so as to emit, by means of internal reflection, a luminous signal, analogous to that of the first device, through said transparent or translucent external surface visible on the front and the side of said vehicle.

For an exemplary embodiment, said first and second luminous devices are associated to effect said optical coupling, match at least one lateral light output from the first device with at least one lateral light input into the second device to emit their respective luminous signals issuing from the same source, said match having the shape of a tight coupling, fitting or a deformable gasket surrounding said light output and input so as to prevent the light from escaping to the interior of the casing assembly.

The following meanings and definitions apply in the present descriptive specification:

The outside cover of the rear-view mirror arrangement is an opaque structural arrangement comprising at least one of the following elements or the combination thereof: a casing cover, one or more half casing covers integrating, at least in part, into the wing frame (normally, one of them is painted, chromicised or decorated with a film) or the chassis directly or indirectly, at least one casing cover included as one piece into the wing frame; or a face part of the internal structure of the rear-view mirror arrangement, or a functional device or a supplementary cover attached to the existing covers.

When integrated, associated and fitted into said frame, the outside cover forms an external association area matching the area farthest away from the bodywork, exposed to impact and scratches when driving. In said area the light output of the first device is usually located matching the outer third of the rear-view mirror farthest away from the vehicle bodywork, visible from the rear along an axis parallel to the vehicle's axis of circulation going through said rear-view mirror arrangement.

The portion of said wing frame defines an external, internal or central recess relative to the outer and inner surfaces or to the median line in said frame, depending on the embodiment wherein the transparent element of the first blinking device is located, preferably without protruding from the contour or outer surface of said frame.

In an embodiment, the transparent element of the first blinking device occupies an area of the wing frame outer surface and/or a portion of said part of the outside cover associated to the frame or a small portion of both.

Each of the luminous blinking devices comprises a transparent or translucent part including at least one outside cover with a definite contour through which their respective luminous signals are output outside.

In an embodiment, the transparent or translucent external covers are separated by means of an opaque wall between the first and the second luminous device, said opaque wall covering part of the structure or interface of at least one of said luminous devices; said opaque part is a portion of an outside cover next to the frame or a portion of said frame.

Said opaque wall interpolated between both luminous devices is generally a structural opaque part of the rear-view mirror (casing cover or supplementary cover); it behaves like a protective area against impacts and scratches, so said structural part or cover is preferably made of an extra hard material (aluminium or carbon fibre, ASA, resins, ABS or polycarbonate, among others); in addition, it allows to improve the luminous contrast relative to the incidence of external beams in daytime by hiding the electro-optical interface, which comprises a selection among: the light source, optical arrangements, reflectors, LEDs, circuits, intermediate optics, light guides, collimators, reflectors, parabolas.

The independence between said first and second devices allows for the addition of other signals and functions that are secured to the structures containing them—for instance, the wing frame—or to one of said closures of the outside cover, forming subsets or sets of associated parts and/or for the association of new functions in one same device or subset by adding emitters and various light outputs that share their electro-optical interface, which entails assembly and testing savings, since they are effected in one single operation.

In an embodiment, said first device is secured and integrated into the wing frame by means of an internal body of its electro-optical interface. The forward orientation of the frame allows for the addition of visible functions visible by the driver as control, telltale and/or welcoming lights.

In an embodiment, the orientation of the outside cover towards the front-side, allows for the addition of location signals so as to have a better perception of the vehicle as seen from the side or the front at daytime or night-time and, in another example, said devices or frontal cover include a complementary viewing camera facing the front and downwards (preferably aimed at the front wheel on the opposite side of the driver), wherein the blinking device, with its light source, assists and facilitates the operation of said camera.

The linking boundary between said frame and the adjacent outside cover offers a gap to include devices or sensors, such as a temperature sensor and an audible device, or to integrate said non-luminous devices in some of said subsets.

That is, the luminous devices of the proposed rear-view mirror arrangement are adaptable to form subsets with the following functions:

Locating the vehicle through the inclusion of a second signal visible from the front at daytime and night-time.

Locating the vehicle through the inclusion of a third signal visible from its dark lateral side at night-time.

Locating and illuminating the door, through an associated module that emits light aimed at said door from said frame, before getting into the vehicle.

A telltale light from said frame confirming the operation of the blinking light.

A telltale light from said frame confirming the operation of a peripheral detection system of said vehicle.

A temperature probe or an associated audible warning element.

Incorporating an auxiliary camera assisted by a light from said subset.

The independence of the modules or devices allows for the mutual rotation and change of their position and for the adaptation to curved surfaces of different casings or to portions of various frames, which means a good deal of savings in time and cost in the phase of development.

In a basic exemplary embodiment, the rear-view mirror arrangement is adapted to emit:

A first signal produced by the first luminous device that is a part of the turning signal and is emitted rearwards and to the side simultaneously with the second associated device oriented towards the front and the side.

To this basic set, the following elements can be added:

A second forward location continuously-on white light signal visible from the front of the vehicle for its perception at daytime and night-time.

And/or a second or third location side continuously-on yellow light signal visible form the dark side or lateral of the vehicle; this signal can have its light source in said first blinking device and receive a conjoint beam of light by means of optical transmission or be a module of independent construction for another embodiment.

In the same embodiment, the first luminous device located in the frame forms a subset with said wing frame and, in addition, is adapted to emit:

A light illuminating the door of the vehicle before getting into it.

An operational telltale light of any colour associated to peripheral presence-detecting systems.

A telltale light confirming the operation of the turning signal using the same light of said turning signal diverted by an optical appendage that helps in another function, such as an early warning of the opening of a door, to locate the rear-view mirror in this case.

A temperature probe located between the outside cover and the frame.

An element that produces a complementary sound.

In addition to avoiding the described problems, the new rear-view mirror improves:

Storage, since the covers or casing covers are painted and manufactured in places different from the rest of the components of said rear-view mirror; by including a second independent device lacking a light source, they can be easily handled, because no operation tests are needed.

Breakage problems, because it does not protrude in the impact-receiving extreme area.

Signal and vehicle perception in daytime because of lack of contrast.

BRIEF DESCRIPTION OF THE DRAWINGS

The enclosed drawings are non-limiting and illustrative of exemplary embodiments. Based on them, by relating similar elements or changing the design, a skilled artisan can obtain an equivalent product without departing from the scope of the present invention.

Opening mO of the wing frame 1, which includes mirror 2 and has a separation 3 so that the former will move and adjust independently from said wing frame 1.

Frame 1, which, in the horizontal portion, has a volume eV1 smaller in comparison than the thickened portion eV of the last third t3 of the rear-view mirror so as to house said devices.

Two horizontal upper T1 and lower T2 lines tangent to said rear-view element or mirror 2 define the position of the plane in height between which said frame device A1 and/or that of the front casing A2 are usually located.

A complementary signal output A1c that is the part the driver can see of the main transparent component of signal A1, which is not visible by the driver, since it is beyond the median line mF of the frame. Said median line of frame 1 represents the tangential vision of the driver in said frame and of the main area of the rearwards projection pattern of the signal emitted by device A1.

Figure 4:
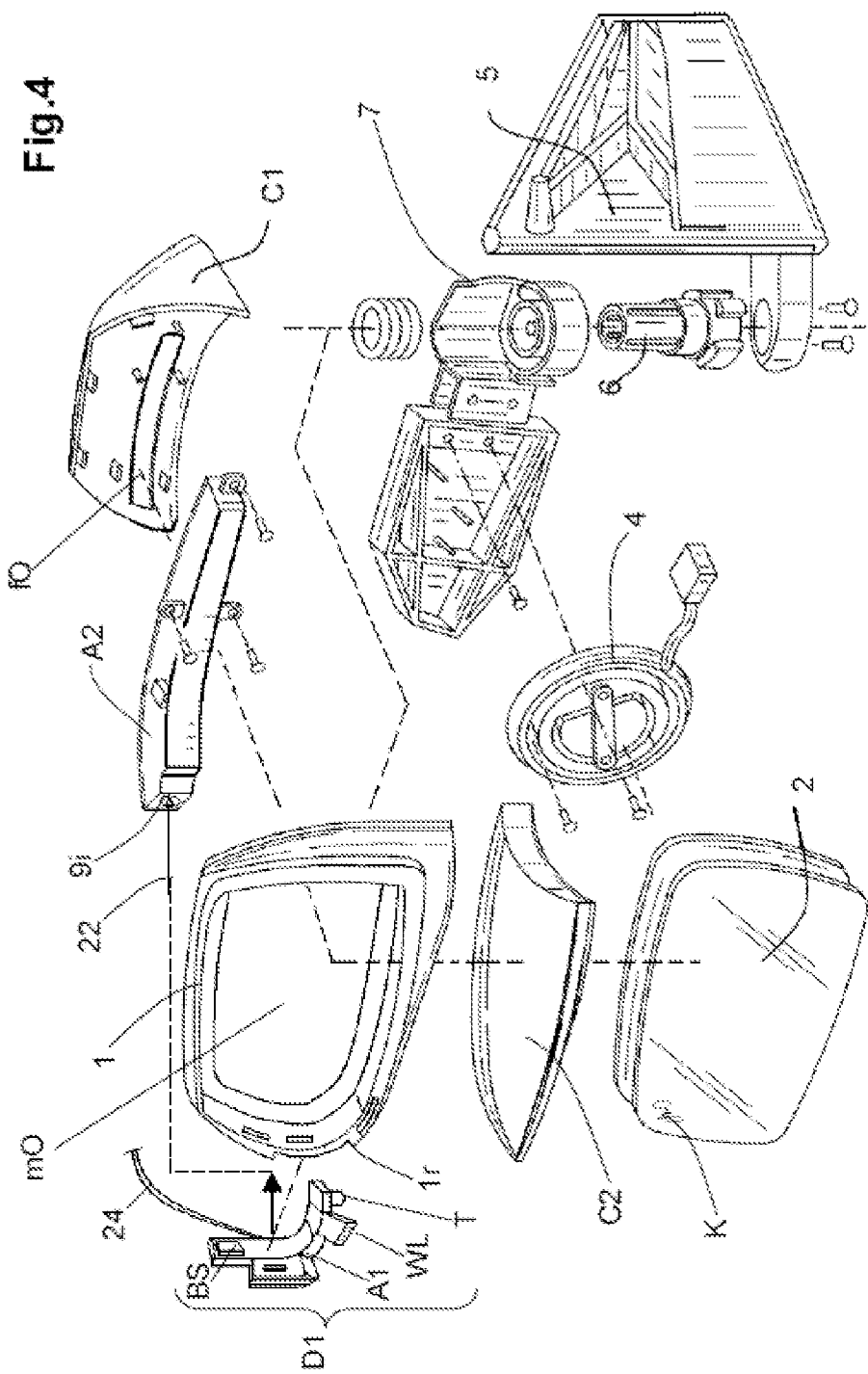

FIG. 4 is an exploded view of the multifunction rear-view mirror, wherein there is shown a frontal device A2 lacking a power cable that has a side light input 9i for receiving a conjoint beam 22 of light, and a multifunction or joint device D1 of frame 1, housed in an external recess 1r; said device D1 includes: an integrated signal WL emitting light towards the door of the vehicle; an integrated signal BS that is a telltale light of peripheral detection systems of the vehicle; and a temperature probe T.

Figure 5:
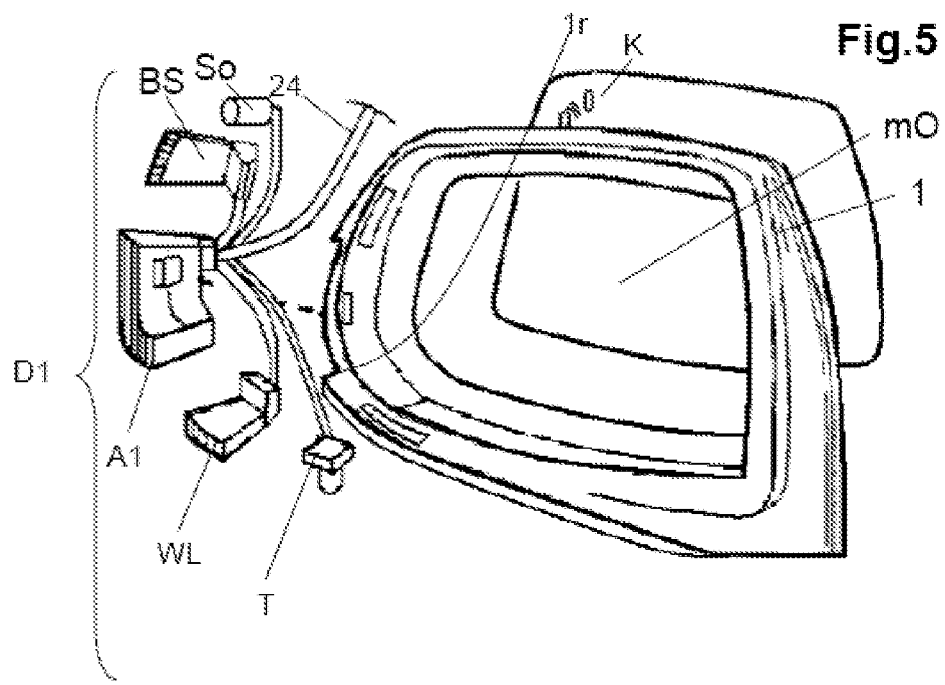

FIG. 5 is an exploded detailed view of frame 1 and the set of devices D1 when these devices are separate and independent from each other, but electrically associated and attached to the frame to as to form a multifunctional subset: frame+blinking devices+sensors.

Figure 6:
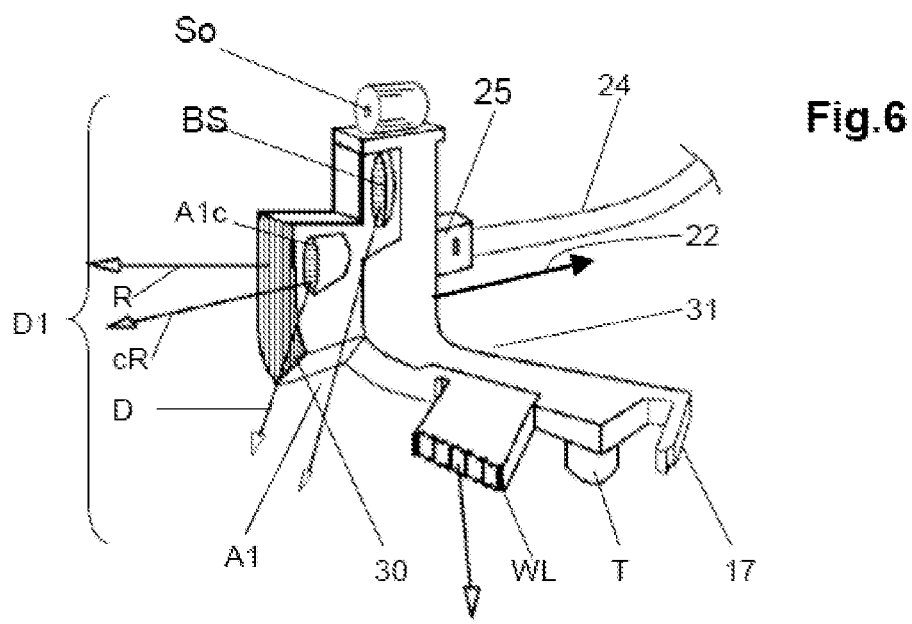

FIG. 6 is a detailed view of a multifunction device of the wing frame 1 as an exemplary embodiment with the associated and integrated elements sharing common pieces: the transparent element 30, the supporting body 31 or the connector 25.

FIG. 7 is a detail of the building method for mutually independent devices that share and exchange pieces for the welcoming light WL and the telltale light BS of a peripheral sensor. The piece exchange is represented by a two-headed arrow Ch. The same interface iN, circuit 21, thermal pathways 21t and supporting body are observed, but the optical bodies 40a and 40b have different light outputs 42a, 42b to emit different patterns of light Wp, Bp.

FIG. 8 is an example of the building method that allows for the mutual exchange (represented with a two-headed arrow Ch) of various devices; since the devices A1 and A2 are independent in their construction, there is shown that the basic device A1 of frame 1, with its interface and light source iN, admits a second device A2a or a device A2b of a different shape and reflection technique. Both lack a light source of their own, but they are adapted to receive a conjoint beam of light through the same type of optical coupling, since there is a match between a light output window 9e and a light input window 9i that has a shape or gasket 8 surrounding them in order to prevent the light from escaping. In an embodiment, A2a has, as a reflector, a light guide 11; in another, A2b has, as a reflector, a collimator or a group of associated facets 14r.

FIG. 9 shows a pattern of signal projections with an upper view of a part of the vehicle with its axis 500 of circulation, frontal, lateral and rear external, Vf, Vs, Vr, and internal—or the driver's—D viewpoints; a multifunction wing rear-view mirror, a horizontal illuminated field 100 and non-illuminated one 200; in the latter, a pattern of signal A1p that cannot be seen by the driver's eyes, projected rearwards R by a first device A1, complemented by the light output A1c that emits a pattern Rc rearwards and also a secondary pattern VD visible by the driver's D eyes, both forming the device D1 of frame 1, combined with a second device A2 that emits the turning signal forwardly F with a frontal pattern A2p, the portion of outside cover eC adjacent to the frame that matches the external association area XS farthest from the bodywork, liable to receiving impacts, being interpolated between both.

FIG. 10 is an upper view that, identically to FIG. 9, shows the projection of other signals: the frontal horizontal pattern FLp of emission of the frontal signal FL along an axis parallel to the axis 500 of circulation; the lateral horizontal pattern Sp of emission of the lateral signal SL along an axis perpendicular to the axis 500 of circulation; a beam of light Wp towards the door illuminates an area of the bodywork; a telltale light beam Bp of emission of a telltale module BS for the peripheral detection system aimed at the driver's D eyes.

FIG. 11 is a frontal perspective view of a basic multifunction rear-view mirror with a frontal device A2 housed in the outside cover eC between two casing covers C and C1, preferably integrated in one of them, and a device A1 housed in frame 1; an external association area XS in the farthest point of the rear-view mirror wherein both devices A1 and A2 become associated, formed by a portion of the outside cover eC and an external portion eF of said frame 1, deserves particular emphasis. Horizontal BB and vertical AA sections are indicated.

FIG. 12, section AA of FIGS. 11 and 13, is a detail of the inner volume iH of the rear-view mirror arrangement formed by the volume mV of mirror 2 in rotation Ro around its actuator 4 plus the casing volume hV, which comprises the blinking device A2 lacking its own light source; the separation 3 with frame 1, wherein the external volume eV or thickening of said frame 1, which is comprised between its internal iF and external eF surfaces and which, in addition, comprises a proximal portion of the outside cover eC, deserves particular emphasis.

FIG. 13, section BB of FIG. 11, shows the extension of the internal reflection duct iC, its facet collimator 14f and the end opaque protection and external separation area XS between the devices A1 and A2, which are optically coupled but are not externally adjacent.

FIG. 14, a detail of FIG. 13, shows the interface iN with two associated circuits 21 that aim their LEDs 20r and 20f in opposite directions and the assembly kinematics Z of the casing cover with the integral device A2 to carry out the coupling between the transparent internal side surfaces 9i and 9e and transmit the conjoint beam 22 of light; in said coupling, a soft gasket 8 prevents the light from escaping and achieving the independence of the devices A1, A2, lacking an interconnection of cables, from the parts they are attached to (frame, casing cover). The end opaque area XS between both devices, matching in this example the proximal, adjacent portion of the outside cover eC to frame 1, deserves particular emphasis.

FIG. 15, a frontal perspective of a multifunction rear-view mirror in a second exemplary embodiment with a frontal device A2 having a light guide 11, housed between the covers C1 and C2, normally integrated in the lower casing cover C2, highlights that both devices A1 and A2 are abutting: there is no external separation or an opaque area between them; the transparent surface s30 of device A1 occupies a portion of frame 1 and a portion of the outside cover eC. This match is included in said far end external association area XS. A level X of said cover C1 can be seen in protrusion as a protection from impacts.

FIG. 16, section AA of FIGS. 15 and 17, shows that device A2 has a light guide 11 in its internal duct iC as an internal reflective element, independent from the transparent external element 10 and located between the transparent external element 10 and the internal body 13.

FIG. 17, section BB of FIG. 15, shows the extension of internal duct iC occupied by a light guide 11 separated from the transparent external element 10 as an axial reflection element.

FIG. 18, a detail of FIG. 15, shows the interface iN with a double-sided printed circuit 21 that aims its LEDs 20r and 20f in opposite directions and the kinematics of assembly method Z of the casing cover with its integral device A2 wherein the transparent internal side surfaces 9i and 9e are coupled so that the conjoint beam 22 of light will enter through them the light guide 11 by means of an optical arrangement 11i; then an internal reflection is produced to emit the beams 22r outside. It can be seen that said modules A1 and A2 are independent in construction, but are externally adjacent, one being next and immediately above the other.

FIG. 19 is a frontal perspective of a multifunction rear-view mirror in a third embodiment with one single-piece outside cover C, where in houses a frontal device A2 that has an internal reflective duct iC occupied in part by a light guide 11 integrated into transparent external surface 10 of said device. A part of the interior of said duct or inner body 14R is emphasised, next to said transparent element 10 and above said guide 11 so as to reflect the external light L as rL and obtain a shade Sh that includes said light guide and/or duct to improve the contrast of the emitted signal in operation during daytime.

FIG. 20 shows section AA of FIGS. 19 and 21, embodiments of integration techniques of the light guide 11 into said transparent external element 10. A device A2a showing that the guide 11a is a part of the same transparent external element 10, and a device A2b showing that the guide 11b is overinjected, which allows said guide 11b to be manufactured in another colour or material, are presented in detail. The detail shows there is an interface 11s between said guide 11b and the transparent element 10, which improves the incidence of external light L, thereby improving the contrast of emitted light. An extra level or protrusion X can be observed in said outside cover eC ahead of the transparent element so as to spare impacts to the latter.

FIG. 21, section BB of FIG. 19, shows a detail of the impedance between the characteristic volumes of the rear-view mirror arrangement (a concept similar to that of FIG. 12) in a horizontal section.

FIG. 22, a detail of FIG. 21, shows that the light guide 11 is integrated into the transparent external element 10 of the second device A2 and a detail of the device A1 housed in the external volume or thickening of the frame eV, comprising, between the internal iF and external eF surfaces of frame 1 and the associated portion of the outside cover eC and, inside the latter, the interface iN of the device A1, a clearance 3 to allow for the adjustment of mirror 2, so that said interface iN is outside and is independent from the inside iH of said rear-view mirror arrangement, which allows for the unrestricted shifting or replacement of said cover or closure C with the device A2.

FIG. 23 is a frontal perspective of a multifunction rear-view mirror in a fourth embodiment wherein the frontal device A2 shares the transparent external element with a second signal and function: the continuously-on lateral position light SL in a second internal duct forming a subset 55 with two functions without their own light source. Part of the transparent surface s30 of device A1 is in frame 1, and another part in a portion of the outside cover eC.

FIG. 24, section AA of FIG. 23, shows the subset 55 with light guides 11a and 11b, two reflective internal ducts iC1, iC2 and an inner body 13 with a portion next to the transparent element 10 to form a separating surface 14r between said signals.

FIG. 25 shows a frontal perspective of a multifunction rear-view mirror in a fifth embodiment that is a variant of the fourth one. See FIG. 23, wherein the functions A2 and SL offer externally separated windows but are the same subset. In another embodiment, they can be two frontal devices A2 and SL independent from each other.

FIG. 26 is section AA of FIG. 25.

FIG. 27, section BB of FIG. 25 over signal SL, shows that the device has at least one LED 20s for the emission towards the side S perpendicularly to the axis 500 of circulation and at least one LED 20r that emits the conjoint beam 22 of light, which provides a light guide 11b and/or internal duct iC2 of said second blinking device SL.

FIG. 28, a cross-sectional detail of a portion of the casing, shows a variant of the integration of the parts and the building method of the rear-view mirror arrangement based on the example of FIG. 20; the casing cover C1 is the same inner body 13, with its internal duct iC and the inner surface 14 of the blinking device A2, and the light guide 11 is the same transparent element 10. In turn, the device A2 and said cover C1 are integrated (guide+transparent element+cover+inner body). The combination thereof is obtained through injection in biomaterial sharing moulds.

A detail of cover C in protrusion X and at a higher level than the transparent element. That way, it protects the latter from impacts and the external light L, thereby producing a shade Sh that improves the perception of the signal.

Figure 29:
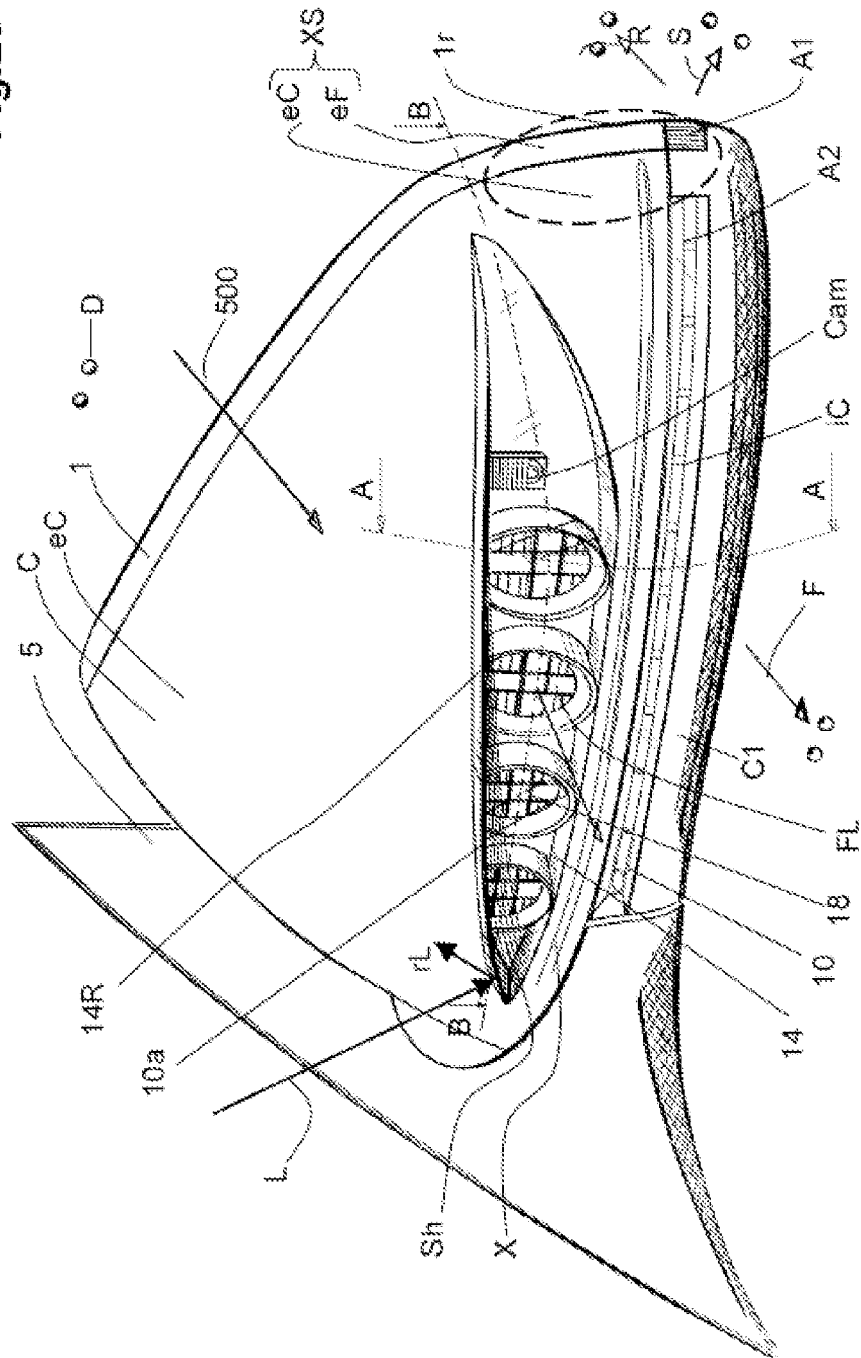

FIG. 29 is a frontal perspective of a multifunction rear-view mirror that includes a continuous white-coloured light in the outside cover being emitted towards the front FL that changes its intensity during daytime or night-time and has an integrated video camera Cam.

FIG. 30, section AA of FIG. 29, shows said device FL located in the outside cover eC of casing C, which is independent from device A2. It has:
A thermal interface iT provided with associated elements to draw heat from its light source through proximity, complementary orifices 33a, 33b for the ventilation through ventilation and a radiator-like inner cover Ra.
Intermediate optical arrangements 18 between the transparent element 10a and LED 20f.
A transparent external element 10a that increases its volume outwards relative to the general level of casing LeH.
The reflector 14 that extends above the electro-optical interface (optical arrangement, reflector, parabolas and LEDs) as a protection or overhanging 14r against the incidence of external light L forming a shade Sh below and to the rear of L1 that improves the contrast of the signal in daytime.
Reflective individual parabolas 19 for each LED 20f associated to their interface, or to the bearer circuit 21m or the LED capsule.
A projection X that is a protruding part of the outside cover ahead of its transparent element 10a as a protection against impacts.

FIG. 31, section BB of FIG. 29, shows the elements described in FIG. 30 and, in particular, that the device FL has parabolas or individual reflective cavities 19 for each emitter 20f, and/or their respective associated bearer card 21m, 21t, with their respective focal axes Fo substantially parallel, and that said emitters (LEDs or LED chips directly plugged into rigid boards 21t in the circuit PCB). They are arranged in substantially parallel planes (y1, y2, y3, y4) and interconnected to one another either by a flexible circuit 21F or cables. See the detail in FIGS. 30 and 31 of the transparent element 10a ahead of the line of the rear-view mirror LeH to gain volume outwards of the rear-view mirror arrangement and the detail of the reflector 14r, which produces a shade Sh to the emitters 20f, parabolas 19, optical arrangements 18 and also the camera Cam, and the detail of the external volume eV of frame 1 that is missing the blinking device and is independent from the inside of the casing.

FIG. 32 shows an operation and connection diagram of a multifunction rear-view mirror arrangement wherein the commands, sensor and a controller 320 activating or regulating the various devices and functions are represented.

DETAILED DESCRIPTION OF EMBODIMENTS

Figure 1:
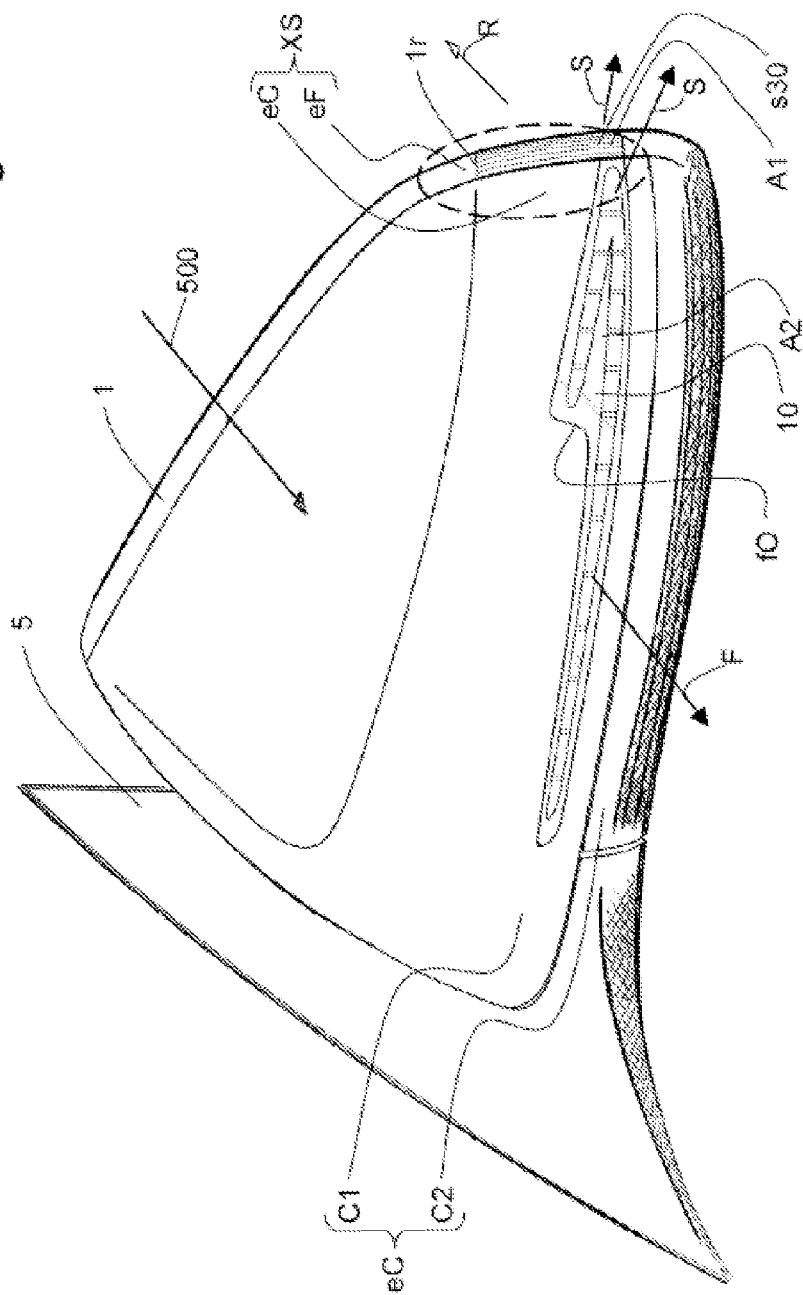
FIG. 1 is a frontal perspective of a basic multifunction rear-view mirror with a frontal device A2 housed in the opening fO of the outside cover eC. A part of said outside cover eC, close to the outer surface eF of frame 1 is indicated as an oval. Both form an external association area XS, which is the outermost point of the rear-view mirror arrangement relative to the vehicle; the device A1, housed in a recess 1r of frame 1, and the direction of light emission to the front F, side S and rear R of said associated devices relative to the axis 500 of circulation deserve particular emphasis.

For a better understanding of the embodiments, before the operation, characteristic and building methods of the blinking devices are explained, the following concepts shall be defined:
1.0—Viewpoints of the blinking devices and the vehicle, light and shadow areas, directions, angles, patterns of emission, main beams and reference of axes. FIGS. 1, 9 and 10.
2.0—Turning signal devices, characteristics and volumes. FIGS. 4, 8, 12 and 21.
2.1—Additional signals and functions. Location, internal duct, separations, attachment, modules, independent devices, integration or subsets. FIGS. 1, 4, 5, 6, 15, 23 and 25.
3.0—Protection of the blinking devices against impacts, the incidence of external light at daytime, heating and building characteristics and methods. FIGS. 19, 20, 28 and 29.
1.0—The wing rear view mirror has (see FIGS. 1, 9 and 10) a protruding position relative to the vehicle bodywork Car that allows it to project a horizontal illuminated area 100 towards the side of the bodywork, limited relative to a shade area 200 towards the interior of the bodywork; in said illuminated area 100 the reference viewpoint are visible: to the front Vf, to the side Vs and to the rear Vr; and a viewpoint of the driver D, which is inside said shaded area 200, from which they have a tangential view of the light output from device A1, but they do not perceive said light directly, since this is emitted rearwards R by the outer surface of frame 1.

The following are taken as reference:
An axis 500 of circulation of the vehicle.
A blinking pattern A1p of emission towards the rear-side emitted by the device A1 of frame 1.
A blinking pattern A2p of emission towards the front-side emitted by the device A2 of the outside cover eC.

A complementary blinking pattern of emission emitted rearwards cR by a complementary light output A1c located on the inner surface iF of said frame 1, also visible by the driver's D eyes in an attenuated or indirect manner not affecting their vision. It acts as a telltale light confirming the operation of said blinker FIG. 9.

The emission direction and angles of the signals according to their main beams are:

F, towards the frontal ocular points Vf along an axis parallel to said vehicle axis 500.

S, towards the lateral ocular points Vs along an axis perpendicular to said vehicle axis 500.

R, towards the rear ocular points Vr along an axis parallel to said vehicle axis 500 but in the opposite direction.

A1p: the horizontal angle of emission of device A1 rearwards and to the side starting from an axis parallel to said axis 500 with an illuminated pattern of a minimal angle of 60° outwardly; said patron is augmented with patterns A1c, rearwards, and A2p, forward-to the side, for said blinking turning signal.

FLp: the horizontal angle of emission of device FL embracing an illuminated pattern with a minimal angle of 20° relative to a focal axis Fo that is parallel to the vehicle axis 500 and corresponding to a continuously-on location white-coloured light signal during daytime and/or night-time.

Sp: the horizontal angle of emission of device SL embracing an illuminated pattern larger than 15° both sides of its focal axis that is perpendicular to the vehicle axis 500 and corresponding to a continuously-on location yellow-coloured light signal, preferably used at night.

2.0—The basic signal of the multifunction rear-view mirror corresponds to a blinking turning signal being emitted in the direction: forwardly, to the side and rearwardly within the described illuminated pattern and it is made up by two devices:

A first device A1 located on the wing frame 1 that has a light source iN.

A second device A2 independent in construction from the first one, but associated with it in functions, located in the outside cover eC lacking its own light source and receiving a conjoint beam 22 of light through optical coupling 9, 9e, 9i from said first device A1.

A device is understood to be a unit in disposition to work—for instance, A1, A2, WL—with its pieces assembled and securely linked to work as an integrated module and/or with the possibility of disintegrating by separating its parts and of stopping having functionality. Its pieces can be linked through pressure, welded together, clipped, bolted or glued to one another constituting a module or a set of pieces that, in some replacement operation or when it is removed, at least one of them can be taken out or put back in or they can become separated from one another.

Said luminous blinking devices have: a transparent external surface 10, 30, 40a, 40b and a supporting body 13, 31, 41 that acts to attach it to the interior of the arrangement and so that the light produced will not spread throughout the interior of the casing iH; in its interior it has reflective means: either on the inner surface 14 of its supporting body, or on a reflective pieces 14f associated to said supporting body or inside the transparent optical body 30 itself or a light guide 11 and, in the case where it has its own light source, it has an electro-optical interface or light source iN with its emitting LEDs 10 or similar, a bearer circuit 21, which is a PCB with its protective or control circuit and, in some cases, a thermal interface iT associated to said light source. FIGS. 6, 7, 8, 18, 29 and 30.

It is to be observed that the device A1, with its own light source, in addition to emitting the light outside towards the rear-to the side R or S, emits at least one conjoint beam 22 of light through a side light output e9, towards the interior of the casing iH; that beam is the one allowing the second associated device A2 to emit light through reflection 22r towards the front and the side.

It is to be observed that the device A2 lacks a light source of its own, a connector or cables, and it is an internal cavity devoid of circuits and emitters; it has a lateral light input i9 to receive said conjoint beam 22 of light and internal reflective optical means.

The particularity of said multifunction wing rear-view mirror arrangement is that it has several volumes and structural parts to house said devices comprising:

A wing frame 1 having an inner surface iF and an outer surface eF, and defining a first opening or mouth mO facing the rear relative to the vehicle's axis 500 of circulation, wherein a rear-view element, mirror 2 and/or camera are housed.

An outside cover eC, formed by means of a combination between at least one or several associated casing covers (C, C1+C2) or an overlapping supplementary cover, one part of a structural piece or one part of a functional device of said rear-view mirror arrangement, said outside cover eC associated to frame 1 being integrated and/or included in said frame 1.

At least one part of said outside cover eC, adjacent and associated to the outer surface eF of frame 1, forms a far end external association area XS (see oval, FIG. 1), located in the third t3 of the rear-view mirror arrangement situated the farthest from the vehicle bodywork.

A volume of the rear-view element mV, defined by the actuator 4 and the adjustment positions of said mirror 2, or by at least one rear-view element occupying said first opening.

A casing volume hV, defined between the outside cover eC and the rear-view mirror volume mV.

An interior of the casing arrangement iH defined by the addition of said casing volume hV and the rear-view element volume mV.

An external volume eV or thickening of the frame 1, defined outwardly of the inner surface iF of said frame 1 up to the external association area XS, located on one side, outwardly and independent from the volume of the rear-view element mV and independent and outside the interior of the casing arrangement iH.

The thickening eV is usually larger in the third t3, which is the point farthest away from the bodywork Car if the rear-view mirror arrangement is divided into three thirds.

Said frame 1, as a structural part, is one piece having:

An inner surface iF, which defines an opening fO, wherein the rear-view mirror 2 is located separated by a clearance 3 that allows for its free movement Ro.

An outer surface eF, which is associated and/or integrated in part with the outside cover eC.

A volume or thickening eV comprised between its internal iF and external eF surfaces associated to said outside cover eC, even when said frame 1 is integrated in the outside cover forming the same piece as a one-piece casing.

A median line mF when its two surfaces remain towards the interior or the exterior thereof. It is noted that, from said median line mF to the exterior, the driver's D eyes cannot see the + - - - −signal being emitted, or they see it tangentially; for instance, when the output of the blinking signal is on said outer surface eF of the frame;

however, when the light output is not located from said median line mF towards the interior, in particular on the third t3 farthest away from the bodywork, the driver's D eyes can see, for instance, the telltale light of a peripheral detector BS; in addition, starting with said median line mF a shade Sh is formed that improves the driver's perception of said lights on the inner surface iF of said frame 1.

Said thickening or volume eV surrounds the mirror volume mV and is independent from and external to it, and it has a clearance or gap 3 between them that allows for the movement of the mirror 2 and, therefore, it is external to and independent from the casing interior iH. FIGS. 2, 3, 12, 21 and 22.

These volumes and parts (FIGS. 1, 2, 3, 11 and 8) allow for:

A first blinking device A1 with its own light source iN, adapted to emit a luminous signal that is at least a turning signal directed rearwards R and to the side S of said vehicle and which occupies, with a transparent or translucent external surface s30, a portion of said frame 1 or a portion of said part of the associated outside cover eC, or a portion of both associated parts—the wing frame 1 and the outside cover eC.

A second opening fO in said outside cover eC usually located behind, to the said and opposite the rear-view element 2, houses a second blinking device A2 that is independent in construction from the first one and occupies, with a transparent or translucent external surface 10, said second opening fO.

Said second device A2 lacking a light source of its own and related to the first device A1 receives, by mans of an internal optical coupling 9, 9e, 9i, at least one conjoint beam 22 of light transmitted from the light source iN of said first blinking device A1.

The second device has internal reflective means to emit at least the same luminous turning signal 22r through said transparent or translucent external surface 10 towards the front F or to the side S of the vehicle. FIGS. 8, 13, 17 and 21.

Figure 2:
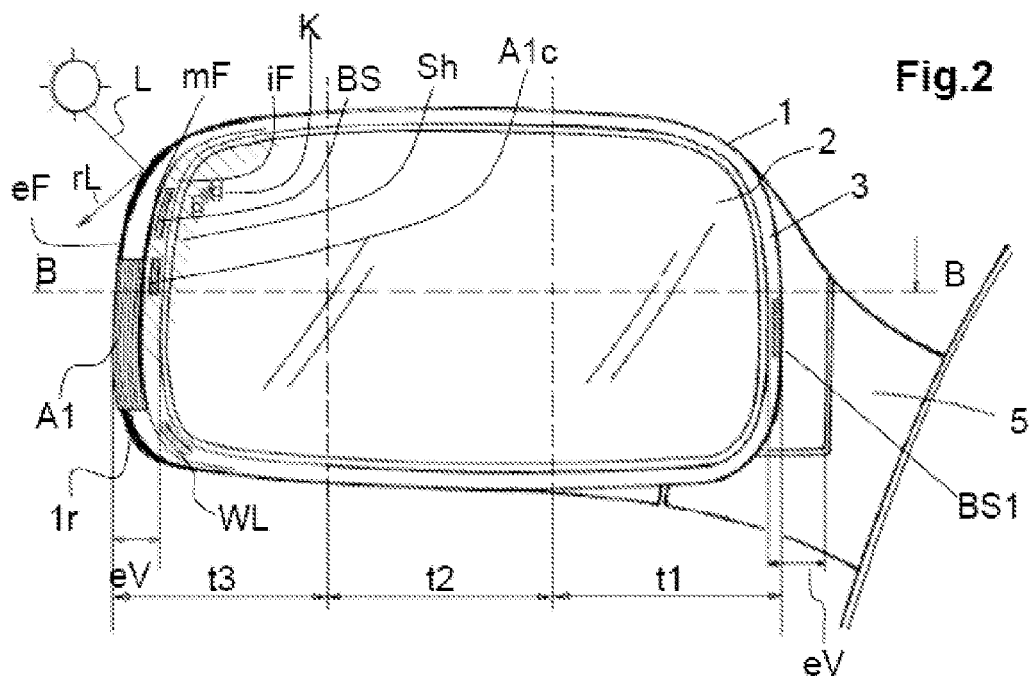
FIG. 2 is a rear view of a rear-view mirror (side of the mirror 2), wherein associated signal-emitting devices are seen that are liable to forming a subset with said frame 1. They are: blinking signal A1 fitting in the recess 1r; light output A1c, complementary to said blinker and separated from A1; welcoming light WL and telltale light BS confirming the operation of a peripheral detection system; a thickening of the frame eV is observed in the point farthest from the bodywork, corresponding to the last third t3 of said rear-view mirror and allows for the inclusion of said devices and, in particular, the location of said telltale light BS in an area of the inner-upper surface iF of said frame 1 protected from the external light L being reflected off the outer surface eF of the frame so that, during daytime, it will form a shaded area (Sh) starting at the median line mF of the frame profile and improve contrast by perceiving said telltale light BS. In detail, an anagram K can be seen etched in the mirror, a complement of said telltale light BS, which is a graph of the warning it gives.
Figure 3:
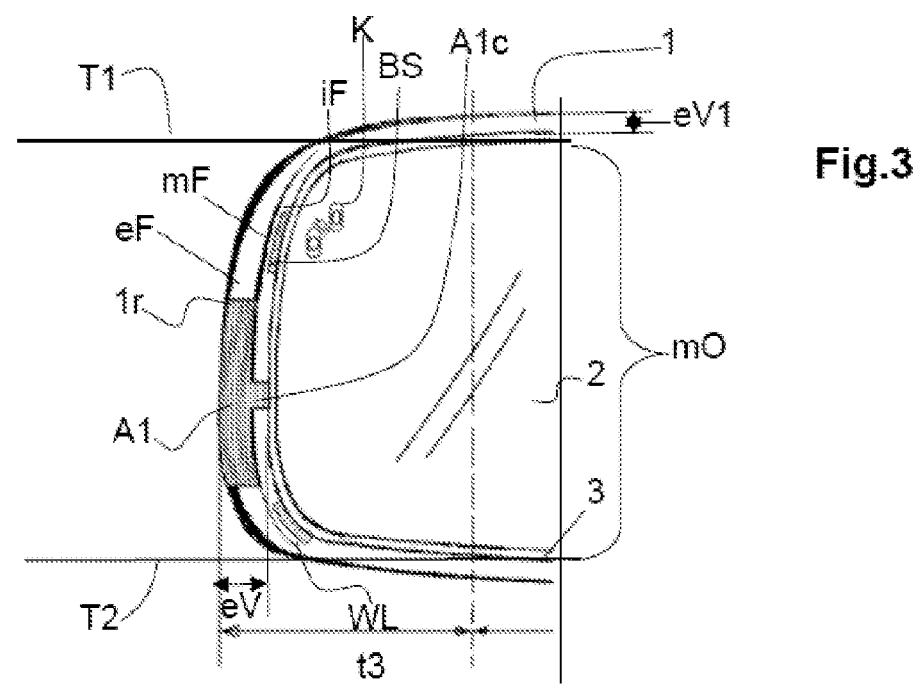
FIG. 3 is a rear and detailed view of a rear-view mirror wherein the following elements can be observed.

Preferably, said transparent or translucent surface s30 of the first blinking device A1 occupies at least one of the portions of said wing frame 1 defined by a recess in its outer surface eF. In other examples, said transparent element s30 occupies a portion of the median line mF or a portion of the inner surface iF of said frame. FIGS. 2 and 3.

Said reflective means are part of an internal cavity or duct iC, formed by a supporting body 13 that is associated to said transparent external element 10; they allow for the axial reflection of the beams 22r of at least part of the conjoint beam 22 of light from the first blinking device A1 that has a light source iN with at least one LED chip 20r, 20f.

LED chip is understood as a light-emitting diode assembled in a capsule 20 and inserted, in turn, in a printed circuit PCB 21, or directly assembled into said PCB; in said capsule or PCB several associated and adjacent LED chips can be assembled in order to obtain an almost one-off emitting multichip LED. Therefore, the designation LED (light-emitting diode) will be used in all cases (20, 20a, 20b, 20r, 20f).

The techniques to reflect the light in said inner duct iC or reflective duct allows for the development of several embodiments:

Firstly, an internal duct iC effecting reflection via surface 14, 14f.

Secondly, a light guide 11 with internal reflection, parallel to a protective transparent element.

Thirdly, a light guide 11a embedded in said transparent external element 10 or that is the same transparent external element 10 of device A2.

Fourthly, a light guide 11b embedded by overinjecting over said transparent external element 10 and made in a different colour.

Axial reflection is used to obtain a light output towards the front-side of the vehicle relative to the longitudinal path of the light in said ducts or light guides 11, 11a, 11b, 10+11. This reflection is directed or semi-directed, diffused or semi-diffused depending on the mechanisation, shape and texture exhibited by said internal reflective surfaces 14f, which are preferably on the bottom of said duct iC, or over a track in the bottom of said light guides.

In a first embodiment, said internal duct iC has a reflective face surface 14 or at least one piece associated to said supporting body 13 which forms a reflective face surface 14 (depending on the case, including one piece to part of the supporting body is preferred to facilitate the metallisation and welding processes) and it has reflective means selectable among facets or associated micro mirrors 14f, a collimator, an etching, or it is plain, metallised, plated, painted or of a material of any colour, even white.

Said internal duct iC is, at least in part, of black or dark colour and it has a surface 14 of any colour and antireflective texture, even in an embodiment including, in addition, reflective means such as a metallised collimator and a light guide 11.

In a second embodiment, the device A2 has, in its interior duct, an elongated transparent optical body 11, protected and substantially parallel relative to the transparent external surface 10, with at least one light input 11i associated and matching the optically coupled light input 9i being emitted from the first device A1 of frame 1.

Said elongated optical body 11 is a light guide 11 with any sectional profile, producing an internal axial reflection 22r, for which it has several means, a series of prisms, facets 14r, arranged in a gradual, regular, even manner, with calculated inclination and separation, or with nanometric proportions, etchings and/or reflective paint or film, depending on how said reflection is intended to be faced; said means being arranged on a track 12 at the same or different level than the internal adjacent surface of the guide 11 depending on the distribution of the light to be reflected and in order not to break the tangentiality of said light in its inner trajectory. The ideal section of the guide is nearly circular; light is then transmitted through the centre 12a. FIG. 30.

Said light guide 11 is usually a transparent material with good light transmittance, larger than 90 percent, made of PMMA or PC; it can be dyed with a hue of a different colour than the transparent external element 10 protecting it, preferably of an orange, yellow or sky-blue colour; it is held by serrations or clips, or is welded to the transparent external element 10, to the internal duct iC, to the supporting body 13 or to the reflector 14, or it is retained between both the transparent element and the supporting body.

In a third embodiment, said casing device A2 exhibits version A2b, which has a light guide 11b that is embedded or overinjected sharing the mould with said transparent external element 10. This way, if the overinjection is effected in two materials, a transparent external element of two colours can be obtained. For this embodiment, the light source iN of said blinking device A1 is within said external volume eV of said wing frame 1, which is a volume independent from the interior of the casing iH, since it is a thickening (a rear-view mirror wing frame is normally solid, has no thickening and would define the casing interior itself), and since said light guide, through its integration with the transparent element, occupies less volume in the outside cover, then said device A2 is liable to extend into the external volume eV of said frame 1.

Other embodiments and building method present a device A2a that has a light guide 11a and a transparent external element 10, which form, at least in part, one single piece that is integrated 10+11a.

Another simplified example presents a device A2c that has a light guide 11c integrated into a transparent external element 10, both of which form one single piece 10+11c; a casing cover C2 is, in turn, the same integrated piece as the support 13 and the reflective duct 14 of the blinking device A2c, and they are obtained from the same mould; this, in turn, allows for the obtention of the integrated transparent parts and the integrated structural parts in one single process by injection in biomaterial. In both examples, the conjoint light 22 transmitted from the device of frame 1 runs internally along said integrated piece 10+11a or 10+11c. FIG. 28.

In these embodiments, the optical coupling between said first frame device A1 and the second casing device A2 is to be considered as characteristic.

Said light input 9i is an internal transparent or optical part of the side of said internal reflective duct or cavity iC that can be part of the transparent external element 10 or an additional overinjected window in the far end of said internal duct iC.

The first blinking device A1 has at least one optical arrangement o lateral internal light output 9e that couples and matches the lateral internal light input 9i of the second blinking device A2. Therefore, the optical coupling between said light output and input has a shape of a tight fit 8 in order to prevent the conjoint beam 22 from escaping said coupling.

For any embodiments, the transparent external surface 30s and 10 of said first A2 and second A2 blinking devices can be in contact and next to each other, or be separated by a face opaque part of any structural part of the rear-view mirror arrangement (casing cover or extra hard closure), or an opaque part of the internal supporting opaque bodies 13 or 31 of said blinking devices.

For any embodiments, the first blinking device A1 comprises:
   A light source iN with an interface having at least one LED 20f that produces a conjoint beam 22 of light in a direction different from another LED 20r that produces the emission of the luminous signal to the side and rear R of said vehicle.
   A first outward light output through a transparent external surface s30 from which it emits the signal rearwards R and to the side S which the eyes of the vehicle's driver D cannot see. Said electro-optical interface iN is based on at least one double-sided printed circuit 21, or at least on one circuit, or a circuit with flexibility, or two opposite associated circuits, or flat or folded metal bases, and it employs LEDs 20, 20r, 20f of one or more chips plugged in normally or at an angle relative to said circuit boards, or emitting in opposite directions, and/or optical, reflective means or prisms such that they will allow for the emission of light in two directions: one combined towards the rear R and to the side S, and another towards said second device A2.
   An attached supporting body 31 enclosing said interface from behind which normally has means to facilitate its fastening through clips or screws to the structure of said frame 1 and means that facilitate the internal reflection to improve the emission of light, for which purpose it is metallised or painted in a light colour, or is made of a light colour material on the surface in contact with the optical body 30.
   Said light source iN, with its electro-optical interface, is associated to said supporting body and said transparent external surface.
   Preferably, at least one transparent or translucent external surface s30 emits the signal going through it, is not visible to the eyes of the driver D, or it is visibly tangentially. Said surface s30 presents two building options: it has a surface associated to its supporting body 31 with a hollow passage traversed by light; or it is a complex transparent optical solid 30, adapted to produce an internal reflection r30 and to emit the light said both directions: rearwards R and to the side S.

This complex optical solid body 30 presents a second light output A1c, complementary of the first transparent external light output s30, located on the inner surface iF of said frame 1. This second light output A1c, visible to the driver's D eyes, emits light at least to the rear cR and is separated from said first transparent external surface s30. As a variant, said first outward light output through a transparent external surface s30 is in part visible by the driver's D eyes and it integrates in its surface extension said complementary light output A1c.

Said transparent or translucent complex optical body 30 is made up at least (FIG. 8) by:
   A light input 30i.
   An internal plain, faceted, etched or partly parabolic surface of internal reflection r30.
   A light output outer surface s30.
   A transparent part for the conjoint light output e9 towards the second blinking device.
   A protected or sheltered part to prevent the internal light from escaping and improve the reflection. It is overinjected in biomaterial 15, or painted, metallised or part of the supporting body 31 and/or of the structure of the rear-view mirror arrangement.

2.1—Additional Types of Signals and Functions:
Type A—The position of said wing frame 1 visible from the vehicle Car driver's D viewpoint, which, in addition, is slightly facing the door of the vehicle and, in particular, the thickening of external volume eV of said frame 1, make the incorporation of other signals and functions therein possible. FIG. 9.
Type B—The position visible from the lateral viewpoint Vs of the vehicle Car and, in particular, of the rear-view mirror arrangement that is in the intermediate area on the dark side of the vehicle Car, away from the forward and rear light groups 50, allows for the incorporation of a location side luminous signal. FIG. 10.
Type C—The position visible from the frontal viewpoint Vf of the vehicle Car and the outside cover eC or any of the casing covers C, C1 of said rear-view mirror arrangement integrating it, and the exclusion of the interior of said casing iH, of the light source iN of the turning signal A1 on the frame, frees volume from the casing hV and allows for the incorporation of a location frontal luminous signal (which, together with the analogous rear-view mirror on the other side of the vehicle, helps to perceive the with of the vehicle seen from the front, locate it and better calculate its position), a function applicable both during daytime and at night-time, for which purpose the light is liable to being adjusted in its intensity:
Greater intensity as a daytime driving light.
Smaller intensity as a frontal position light or as a parking light. FIGS. 10 and 31.
A-Type Signals:
   The third device BS or BS1, a telltale light confirming the operation of a vehicle's peripheral detection system, emits a pattern of light Bp of any colour towards the driver's D eyes.

The light output of said third device is a shaded area Sh sheltered from direct sunlight L, on the inner surface iF of said frame in the upper part above the equator of the rear-view mirror arrangement and in the third t3 farthest away from the bodywork Car. It can be located in any part of the perimetric frame visible by the driver D. FIGS. 2, 3, 4, 5, 6 and 7.

The fourth device, or the welcoming light WL, which emits a pattern of light of any colour directed towards said vehicle's door and its handle that is turned on before getting into it, operated by a remote control or through the unlocking of its locks when it is stopped, and turns off automatically by means of a controller or timer or at a determined speed. FIGS. 2, 3, 4, 5, 6 and 7.

Said third and fourth luminous devices are formed by at least one of the following elements or a combination thereof (FIG. 7):

- A light source iN with its interface, circuit 21, connections 24 and LEDs 20*a*, 20*b*.
- A supporting body formed by at least one piece 41.
- A transparent complex optical solid body 40*a*, 40*b* with its light input 43.
- An internal reflection area 44.
- A light output optical group 42*a*, 42*b* adapted to an emission pattern BS, WL based on its specific function.
- A part 45 protected by overinjection in biomaterial o metallised and/or painted to prevent the light from escaping and/or improve internal reflection.

The similar shape and size of a large part of said third and fourth luminous devices allow them to share and exchange pieces, moulds, assembly tools and/or welding. As an example of a combinable assembly method, starting with a welcoming light module WL, a telltale light BS can be obtained by changing the colour of the LED and the optical body.

Other devices located and included in said wing frame 1 are a temperature probe T or means to produce an audible signal So.

The small size of said devices set forth above allows various building combinations and the integration of their pieces for an embodiment. Said third and fourth luminous devices, temperature probe and/or audible signal can go, with their power cable 24, 25 connected in any way (directly without a connector, or with a connector integrating into a supporting member 25), through the rotatable shaft 6 of the rear-view mirror arrangement. FIG. 7.

At least two of the said first, third and fourth luminous devices, temperature probe and audible element share unified pieces, the transparent element, the supporting body, circuitry, a common connector or negative or the combination of both, forming subsets or modules of more than one function. This integration is extensible to the way said devices interconnect in parallel, in series or in a network starting from one common connector.

The position and assembly of said frame 1 from the outside or the inside allow a portion of said internal supporting bodies 31, 41 of the devices or subsets located in the frame 1 to replace an externally visible portion of said frame 1 or a portion of the outside cover eC next to said frame 1 and associated to it. FIGS. 5, 6.

B-type signal. This signal forms part of the first blinking device A1 and it consists of the emission of a continuously-on yellow-coloured light SL towards the side of said vehicle with a focal axis perpendicular to it. It is switched on with the sidelights simultaneously on both sides of the vehicle. It can transmit the light by optical coupling 9 to a second blinking device A2 associated to the outside cover eC that has at least one duct iC2 or iC1 provided with different reflective means (a light guide or a collimator) 11*a*, 11*b* and adapted to receive a conjoint beam of light from the frame device. FIG. 27.

In another embodiment, the lateral position light device SL arranged on the outside cover eC is independent from the second device A2 of the blinker, but dependent on the light source of the first frame device A1.

C-type signal. Said rear-view mirror arrangement has a second or third luminous device on its outside cover fit to emit a continuously-on white-light luminous signal towards the front FL that works simultaneously with another analogous signal being emitted from a rear-view mirror arranged on the other side of the vehicle, such that it allows to perceive the width of the vehicle seen from the front and has a focal axis parallel to said axis 500 of circulation of said vehicle. FIGS. 29 and 30.

Said device FL emits the white light signal towards the front and it is fit to emit said light during daytime when the vehicle's operation is begun and to stop emitting light or lower its intensity when the driving lamps L1 of said vehicle are turned. FIGS. 8 and 9.

Said devices fit to emit a continuous signal of white light forwardly FL and/or a continuous signal of yellow light towards the side SL use a control circuit 320 powering the light emitters through digital or analogic pulses with a cyclic on and off interval represented by zeroes and ones, with a frequency larger than 15 Hertz, so that it will be perceived by the human eye as a continuously-on light, due to the delay memory effect of the retina. See FIG. 30 (operation diagram).

Since the light source iN of the turning signal A1 is located in the thickening of the frame 1 and there is more available volume inside the rear-view mirror arrangement iH, in another embodiment, in order to avoid interference with internal pieces of the rear-view mirror, volume is gained outwardly of said outside cover eC by means of a projection of a portion of the transparent element 10 extending outside the overall surface line LeH of said outside cover eC, increasing the volume of said frontal blinking devices outwardly of said casing volume hV. FIGS. 30 and 31.

In another embodiment, at least one of the luminous devices having the transparent external surface 10 on said outside cover eC exhibits externally at least one visible window and shares the same transparent piece.

The rear-view mirror arrangement and its functions obey certain commands: some pertaining to the vehicle's overall system and others being specific. Said commands are related at least to one controller 320 that, by means of language, pulses or programming, can change or adjust the switching on, the switching off, the synchronisation, the reduction of intensity and the time of operation, and they form a selectable group: 301 turning light, 302 emergency, 303 lock catches—alarm, 304 remote control-key, 305 driving lamps and sidelights, 306 daytime light (for instance, associated to an automatic daytime/night-time photo-sensor 309), 307 parking light, 308 light for an additional camera related to speed or gearing, 310 conductor or taxi switch, 311 and 312 handle switches, related to the early warning of the opening of doors, 313 function indicators or displays in the vehicle interior, 314 peripheral detection sensors: radars, cameras, ultrasound, laser, among others.

3.0—Protection against impacts, the incidence of external light and heating. FIGS. 19, 20, 28 and 29.

The blinking devices should work in all conditions. It is known that wing rear-view mirrors can easily receive impacts. Therefore, the rear-view mirror arrangement having at least one of the luminous devices A2, SL, FL, whose fragile transparent external surface 10, 10*a* occupies a part of said outside cover eC, is endowed with a forwardly protruding or projecting proximal profile X relative to said transparent surface so that it, rather than said transparent element, will receive external impacts.

Preferably, said level X goes ahead of one of the covers C, C1 and, in particular, in the external association area XS adjacent to frame 1 that is located in the lateral point farthest away from the bodywork; as far as possible, it uses an elastomeric material buffering the impacts, or a material harder than the rest of the abutting structural parts; for instance, metal (treated aluminium), carbon fibre or a plastic resistant to strong impacts, polycarbonate or ABS, ASA with additives.

Frame 1 houses in its external volume eV or thickening devices that remain on for a short time, but said outside cover eC houses devices that are continuously on. In order to obtain better performance of the LEDs, a thermal improvement solution is applied wherein at least one of said luminous devices with a source light of their own (A1, SL, BS, WL, FL) has a cooling system or a thermal interface iT fit to dissipate the heat produced in the LED chips of said light sources and their associated circuitry. FIGS. 30 and 31.

Said thermal interface iT cools down the light source and its LEDs by means of a heat transmission chain based on the proximity and the association of elements starting with said LEDs (20, 20a, 20b, 20r, 20f) until the heat is transmitted outside said the device or system. It comprises at least a combination of the following elements:

- A rigid 21 or flexible 21F bearer printed circuit with broadened tracks around the emitters or LEDs, wherein they are inserted normally or at an angle or on opposite sides of at least one of said LEDs having at least one chip.
- Thermal pathways 21t going through said bearer circuit 21, 21F to transmit the heat from a first face to the second, opposite face.
- A metal base 21m attached to said face 21t of the bearer circuit or to a flexible circuit 21F (of heat-resistant material: polyester, capton; preferably said metal base 21m helps to secure and position the LEDs in the assembly interconnecting said boards through cables or a flexible circuit or conductive film) or to printed tracks on said metal base with at least one substrate.
- At least one chip plugged into the same printed circuit bearer card.
- An additional internal cover Ra made of metal or a good heat-conducting material, attached to said metal base, exhibiting radiator-like fins.
- At least one orifice 33a, 33b with its corresponding trap in the water inlet or a valve balancing the internal and external atmospheres. FIG. 29.
- Facilitating an air circulation duct inside said rear-view mirror arrangement.

The blinking devices located in the outside cover (A2, FL, SL) have an electro-optical interface in the combination of elements to emit, reflect, refract, direct the light from their cavities, in addition to their light source, in a determined direction, even adapted to assist a viewing camera.

The incidence of external light L during daytime makes the perception of signals difficult. Therefore, said blinking devices (A2, FL, SL) are endowed with a surface protecting from direct incoming external light L on said electro-optical interface (emitters, reflectors and internal optics), which consists of an opaque part of the rear-view mirror device or arrangement that does not allow the light to go through (reflector 14, supporting body 13, outside cover eC), being arranged next to the transparent external surface 10, 10a and/or above at least one element of said electro-optical interface (such as a visor) and/or said elements of the electro-optical interface are at such a depth in their cavities that at least one is included in the shade projected by the external zenithal light in said device. FIGS. 19, 20, 26, 28, 29, 30 and 31.

To concentrate the light on a focal axis F for the frontal signal FL, its LEDs have:

- At least one element concentrating light through reflection (parabolas 19) or refraction (convergent optics, Fresnel or prisms, 18) or a combination thereof, their axes being oriented in a substantially parallel form.
- For the LED 20f, at least one reflective cavity 19 (preferably at least in part parabolic) that concentrates the direction of the light emitted by said LED around its focal axis Fo.
- At least two frontal LEDs 20f inserted into bearer circuits (21F if the latter are flexible, 21m if they are made of associated or rigid metal, combined and interconnected by cable or a flexible circuit or a film conductor), positioned on one or several associated planes (y1, y2, y3, y4) so that their focal axes Fo have a substantially parallel alignment.

Said reflective cavities 19 or optics 18 are individually associated to each LED and/or the bearer boards of each LED, and/or the thermal interface, and/or the intermediate optical arrangement or the transparent external surface 10.

For any of the above-described exemplary embodiments and as a building method, the following applies:

The blinking and function devices are firmly attached to the frame 1 and the outside cover eC by means of serrations, clips 17, screws 16, or are glued or welded to said structural parts, and their replacement is carried out by directly releasing said device outwardly; or, indirectly, by removing, rotating or shifting at least one piece of the rear-view mirror arrangement before accessing the means to release said blinking or function device; for instance, firstly removing a casing cover C, C1, or the mirror 2 or the chassis 7.

At least one of said blinking or function devices forms subsets integrating and sharing at least one piece or supporting link between said functional devices forming a set of parts; for instance, the transparent element or the supporting body; or between the functional device and the structural piece (for instance, said wing frame 1 or some casing covers C, C1 of said outside cover eC, or a supplementary casing cover), through integration by overinjection in bimaterial, mechanical assembly, welding or gluing with some structural piece. As an exemplary embodiment, among other combinations, a subset is integrated (frame 1+A1+BS+WL or casing cover C1+A2+FL). FIGS. 2, 3, 5, 6, 28.

At least one of said subset blinking or function devices or structural part of the wing frame or the casing cover, which constitutes a set of parts is liable to be replaced by a similar one matching in fitting but equipped with the same or different devices and functions, or with at least one device of a different design, or with a surface finish, decoration, texture, paint or with a decorative film attached through any process or made of a different extra hard material, aluminium or carbon fibre, among others.

Said set forth building technique and method consist in associating one first device having a light source with one second device lacking a light source and being independent in construction, which receives light from the first one through conjoint optical coupling to produce an emission reflected in the second one. In order to improve the robustness and standardise the building of both, it is applicable to air, terrestrial and naval vehicles, to architecture, machinery and household appliances.

A skilled artisan might introduce changes in the described embodiments without departing from the scope of the invention as defined by the enclosed claims.

The invention claimed is:

1. A multifunction rear-view mirror arrangement for vehicles comprising:

a wing frame (1), provided with an inner surface (iF) and an outer surface (eF), that defines a first opening (mO) oriented rearwards relative to the vehicle's axis (500) of circulation and has a rear-viewing element, mirror and/or camera in said opening, an outside cover (eC) formed by selectable and combinable structural parts among at least one or several casing covers (C, C1+C2) or, in part, a supplementary casing cover or a face surface of a structure or device adjacent to said frame, or a single-piece casing that includes said frame (1), a first blinking device (A1) with its own light source (iN), adapted to emit a luminous signal that is, at least, a turning signal directed rearwards and to the side of said vehicle and which occupies, with a transparent or translucent external surface (s30), a portion of said wing frame or a portion of the adjacent outside cover, or a portion of both associated parts—the wing frame and the outside cover, a second opening (fO), which is at least one, located in said outside cover, characterised in that at least a second blinking device (A2) lacking its own light source and independent in construction from the first blinking device, occupies, with a transparent or translucent external surface (10) delimiting it, said second opening (fO) occupying, with at least one internal cavity (iC) housing a supporting opaque body (13) with internal reflective optical means (11, 11a, 11b, 12, 14), said internal cavity (iC) being associated to said transparent external surface (10), which provides at least one light input (9i) received from at least one light output (9e) of said first blinking device (A1) so that an optical coupling (9, 9e, 9i) takes place through which said blinking device (A2) receives at least one conjoint beam (22) of light transmitted from the light source (iN) of said first blinking device (A1), so as to emit, by means of internal reflection (22r), a luminous signal, analogous to that of the first device, through said transparent or translucent external surface (10) visible on the front and the side of said vehicle.

2. The multifunction rear-view mirror arrangement according to claim 1 characterised in that said transparent or translucent surface (s30) of the first blinking device (A1) occupies at least one portion of said wing frame (1), defined by a recess (1r) in its inner surface (iF), or an area including its median line (mF) between said inner and outer surfaces, or on its outer surface (eF), and it allows the latter external position to maintain contact with the transparent external surface of said second device (A2) or to interpolate between them an opaque protective area against impacts that usually coincides with the far end external area (XS) located in the third (t3) of the rear-view mirror arrangement farthest away from the vehicle bodywork (Car), which area (XS) is formed between a portion of said outside cover (eC) adjacent to a portion of the outer surface (eF) of said frame (1).

3. The multifunction rear-view mirror arrangement according to claim 1 characterised in that said internal cavity (iC) of said second blinking device (A2) is an internal duct devoid of electric components or cabling, with a face surface (14), on which it has reflective means selectable among associated facets or micro mirrors (14f), a collimator or an etching, or it is plain, metallised, plated, painted or of a material of any colour, even white or, at least in part, of black colour or a dark colour.

4. The multifunction rear-view mirror arrangement according to claims 1 characterised in that said internal duct (iC) has in its interior an elongated transparent optical body (11), which is a light guide in a transparent material dyed the same as, or in a different colour from, the external transparent surface (10) with any sectional profile, substantially parallel to said external transparent surface (10), which integrates:

at least one light input (11i) through an end, associated to said light input (9i) of the conjoint beam (22), reflective means to produce an internal axial reflection, selectable among a series of prisms, facets, etchings and/or a reflective primer or paint arranged gradually, regularly, evenly and even with nanometric proportions, a track (12), for the housing of said reflective means, that is at the same level as, or at a different one from, the internal adjacent surface of said light guide, said light guide being held by means of serrations, clips, or being welded, retained or embedded by injection in bimaterial in/into the external transparent surface (10), the internal duct (iC), the reflector (14), the supporting body (13) or between both.

5. The multifunction rear-view mirror arrangement according to claim 2 characterised in that said first blinking device (A1) occupies, at least in part, a framework volume (eV), independent from the inner volume (iH) of the rear-view mirror, defined between the frame inner surface and said far end exernal area (X), comprising a selection of pieces and functions combinable among:

a transparent or translucent complex optical body (30) with at least:
a light input (30i).
a rearwards (R) light output transparent or translucent external surface (s30).
an internal plain, faceted, etched or partly parabolic surface of internal reflection (r30).
a transparent part for the conjoint light output towards the second blinking device (e9).
a second complementary light output (A1c), visible by the driver's eyes (D), that emits light at least rearwards (cR) and is separated from said first transparent external surface (s30) or is a surface extension not separated from the latter.
a bimaterial-overinjected part (15).
a light source (iN) with a circuit having at least one LED (20f) that emits light (22) in said conjoint direction different at least from another LED (20r) of the same interface that effects the emission of the signal to the side and rear R of said vehicle.
a part protected by the outside cover, or a part of the supporting body and/or of the structure of the rear-view mirror arrangement (15) and/or painted or metallised.
a third or a fourth light output for other functions integrated in the same transparent body (30) corresponding to a welcoming light (WL) or a telltale light (BS) confirming operation.
a number of associated devices that carry out non-luminous functions, such as a temperature probe (T) or a device to emit a sound signal (So).
one common negative when it carries out more than one function.

6. The multifunction rear-view mirror arrangement according to claim 1 characterised in that it integrates, in said wing frame, a third luminous device (BS, BS1) that emits towards a driver's eyes a pattern of light (Bp) of any colour as a telltale indication of the operation of a peripheral detection system of the vehicle located in a shaded area (Sh) sheltered from direct sunlight (L), preferably on the inner surface (iF) of said wing frame.

7. The multifunction rear-view mirror arrangement according to claim 1 characterised in that it has, in said wing frame, a fourth welcoming luminous device (WL) emitting a pattern of light of any colour directed towards said vehicle's door and its handle that is turned on before getting into it, operated by a remote control or through the unlocking of its locks when it is stopped, and turns off automatically.

8. The multifunction rear-view mirror arrangement according to claim 2 characterised in that said first blinking device (A1) emits at least a second signal, which is a yellow-coloured continuous light (SL) directed towards the side (S), with a focal axis perpendicular to the axis (500) of said vehicle, and it is switched on with the sidelights simultaneously on both sides of the vehicle and is susceptible to carrying out optical coupling (9) with said second frontal device (A2) using a second internal duct (iC2) provided with reflective means different from those of the first duct (iC1) or with a third device (SL) independent from the second one (A2) but dependent on the first one (A1).

9. The multifunction rear-view mirror arrangement according to claim 1 characterised in that it has, on its outside cover, a second or third luminous device (FL) fit to emit a continuous luminous signal of white light forwardly, which operates simultaneously with another analogous signal from the rear-view mirror arrangement on the other side of the vehicle so that it allows the perception of the vehicle width as seen from the front, and it has a focal axis parallel to said vehicle's axis (500) of circulation adapted to work during daytime when the vehicle's operation is begun and to stop emitting light or lower its intensity when the driving lamps (L1) of said vehicle are turned on, for which it has optical or reflective light-concentrating means selectable among:
- at least one LED (20f) associated to a substantially parabolic reflective cavity (19),
- at least one optical arrangement (18) between said LED and the transparent external material (10) or embedded in the latter,
- at least two LEDs (20f) embedded in bearer circuits (21F, 21m) positioned on one or several associated planes (y1, y2, y3, y4) such that their focal axes (Fo) have a substantially parallel alignment.

10. The multifunction rear-view mirror arrangement according to claim 9 characterised in that said devices fit to emit a continuous signal of white light forwardly (FL) or of yellow light towards the side (SL) use a control circuit (320) powering the light emitters through digital or analogic pulses with a cyclic on and off interval represented by zeroes and ones, with a frequency larger than 15 Hertz, so that it will be perceived by the human eye as a continuously-on light.

11. The multifunction rear-view mirror arrangement according to claim 10 characterised in that at least one of said luminous devices having their own light source (A1, SL, BS, WL, FL) has a cooling system based on a heat transmission chain through proximity of elements starting with said LEDs (20, 20a, 20b, 20r, 20f) or their associated circuits until the heat is transmitted or dissipated outside the devices, comprising at least one of the following elements or a combination thereof:
- a rigid or flexible bearer circuit (21, 21F) of any kind, with broadened tracks around at least one LED of any type with at least one light emitting chip.
- an associated protecting or control circuit arranged inside or outside the device,
- thermal pathways (21t) going through the bearer circuit to transmit the heat from a first face to the second, opposite face.
- a metal base (21m) attached to said face (21t) of the bearer circuit or to a flexible circuit or to interconnection cables or with printed tracks on said metal base with at least one substrate.
- at least one chip plugged into the same printed circuit bearer card,
- an additional internal cover (Ra) made of metal or a good heat-conducting material, attached to said metal base, susceptible to exhibiting radiator-like fins.
- at least one orifice (33a, 33b) with its corresponding trap in the water inlet or a valve balancing the internal and external atmospheres.
- means, orifices or an air circulation duct inside said rear-view mirror arrangement.

12. The multifunction rear-view mirror arrangement according to claim 11 characterised in that the blinking devices (A2, FL, SL) located on the outside cover have a part of the device itself or of the associated outside cover (eC) of the rear-view mirror arrangement that, like a visor protecting from incoming external light, will not let sunlight go through, arranged above and close to at least one optical or reflective element, and/or said elements of the electro-optical interface are at such a depth in their cavities that at least one remains inside the shade (Sh) projected by a zenithal light outside said device.

13. The multifunction rear-view mirror arrangement according to claim 10 characterised in that at least one of said blinking devices (A1, A2) shares and exchanges/combines:
- moulds to embed its pieces injected in bimaterial,
- common pieces and/or structural pieces with those of other functional devices and/or embeds pieces from one single mould and of the same material being said pieces from a selection comprising:
- one single supporting body (41) of the welcoming light (WL) and telltale light (BS) devices of the frame (1) that exchange their optics and circuits (40a, 40b, 20a, 20b),
- a casing cover (C1) that is the same piece as the support and internal duct (13, 14),
- an external transparent surface (10) that is the same piece as the associated light guide (11),
- said embedded casing cover (C1) and internal duct (13, 14), which, in turn, through injection in bimaterial, include said embedded transparent surface (10) and Light guid e (11) integrated,
- the integration between wing frame—transparent surface (s30), casing covers (C1)—transparent surface (10), circuitry, one common connector, one common negative or other combinations forming subset or modules of at least one function, or at least two of such blinking devices or functions forming a group interconnected in parallel in series or in a network starting from one common connector.

* * * * *

UNITED STATES PATENT AND TRADEMARK OFFICE
CERTIFICATE OF CORRECTION

Page 1 of 1

PATENT NO.         : 8,491,170 B2
APPLICATION NO.    : 13/129160
DATED              : July 23, 2013
INVENTOR(S)        : Rodriguez Barros It is certified that error appears in the above-identified patent and that said Letters Patent is hereby corrected as shown below:

On the Title Page, Item [57] Abstract:

Delete the abstract in its entirety and replace with:

An external cover eC associated with an external frame 1 that defines an aperture where a rear-view mirror 2 is seated, and includes in said frame 1 a first luminous signal device A1 with its own light source iN that emits a signal backwards R, and in said external cover eC, opposite the mirror has a second luminous signal device A2, without its own light source, that emits an analogue signal forwards F, after receiving via an optical coupling a shared light beam 22 from said first related signal device A1.

Signed and Sealed this
Eighteenth Day of February, 2014

Michelle K. Lee
*Deputy Director of the United States Patent and Trademark Office*